INVENTOR
JOSEPH A. BELLINO
BY R.C. Terry
ATTORNEY

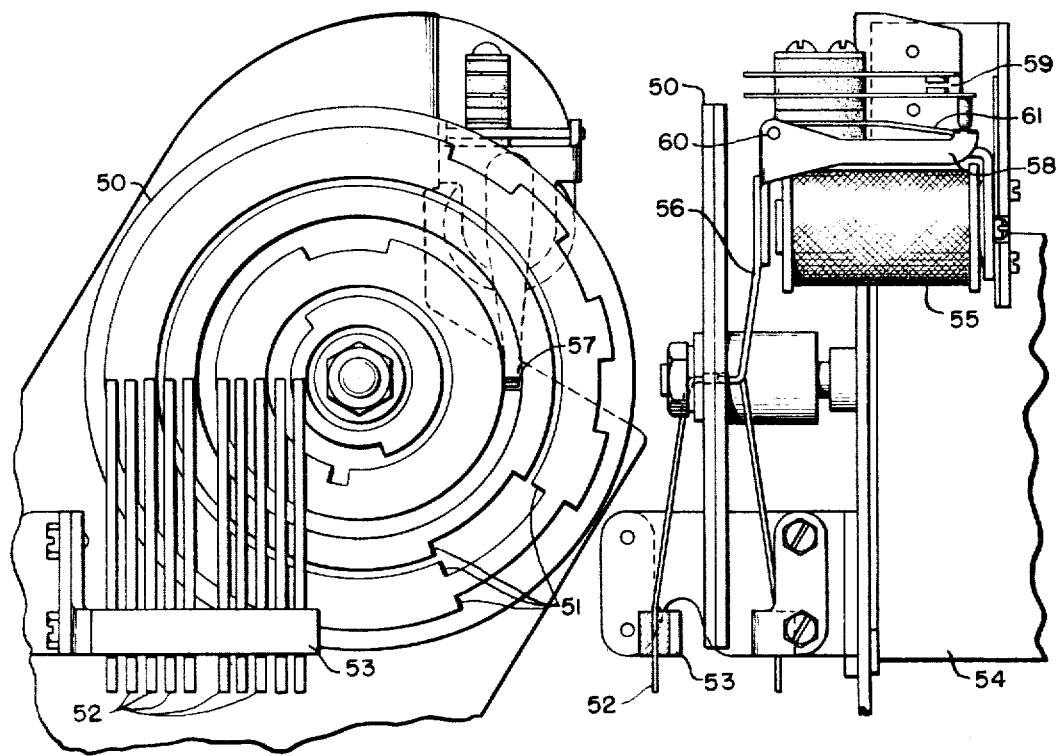
FIG. 3
FIG. 4
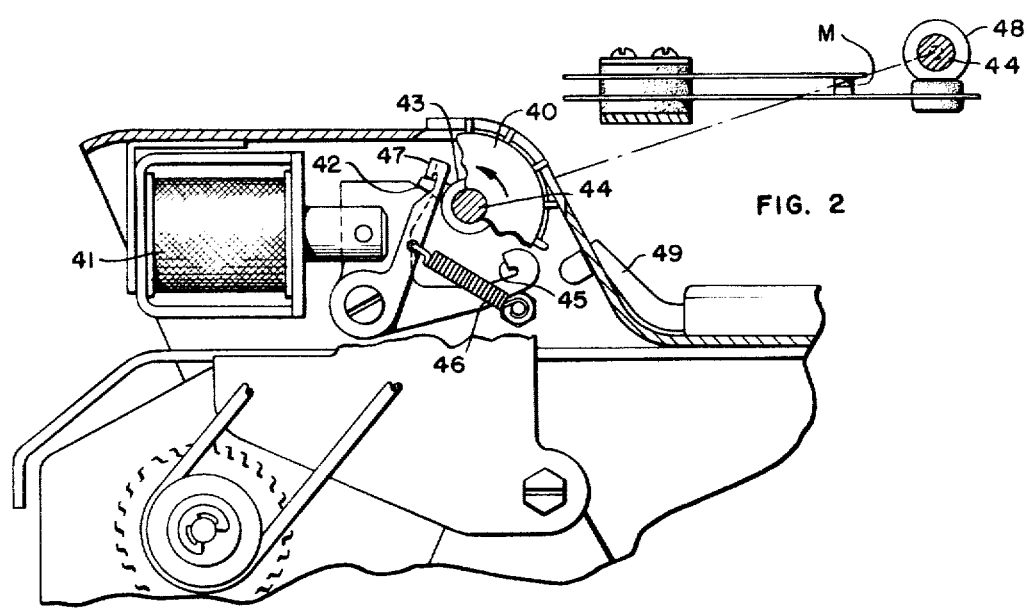
FIG. 2

United States Patent Office 3,340,504
Patented Sept. 5, 1967

3,340,504
ERROR DETECTION AND CORRECTION SYSTEM WITH BLOCK SYNCHRONIZATION
Joseph A. Bellino, Arlington Heights, Ill., assignor to Teletype Corporation, Skokie, Ill., a corporation of Delaware
Filed Jan. 27, 1964, Ser. No. 342,590
6 Claims. (Cl. 340—146.1)

ABSTRACT OF THE DISCLOSURE

Information is transmitted continuously in blocks of fixed lengths. A pull-back, paper tape reader is used at the transmitting station and stores tape containing at least one block of information between the conventional feed wheel and a pad-out feed wheel. Horizontal and spiral parity checks are made on each block transmitted; and if an error is detected by the receiving station, a discrete rerun request signal is sent on a return channel from the receiver to the transmitter causing interruption of the transmission of the block then in progress. The tape then is pulled back and the errored block is retransmitted, and at the receiver, the errored block is deleted from the tape by a second reperforator simultaneously while the retransmitted block is recorded by a first reperforator. Transmission also may be stopped by the receiving station by sending a discrete stop signal to the transmitting station which causes interruption of the transmission of the block then in progress. The block preceding the interrupted block then is released from storage by operation of the pad-out wheel, following which the tape is pulled back to permit retransmission of the interrupted block. The receiving station then initiates retransmission by sending the rerun signal to the transmitting station whereupon the interrupted block is retransmitted, and at the receiver the interrupted block is deleted simultaneously while the retransmitted block is recorded. If a line disconnect occurs on either the transmission channel or the return channel, transmission and recording are interrupted. At the transmitter the block preceding the interrupted block is released from storage by operation of the pad-out wheel, and at the receiver the interrupted block is completed by perforating fill characters into the tape. Upon re-establishment of line connections, the tape at the transmitter is pulled back and retransmission of the interrupted block commences while at the receiver the interrupted block is deleted from the tape by the second perforator simultaneously while the retransmitted block is recorded.

---

This error detection and correction system is an improvement over the error detection and correction system disclosed in copending application No. 162,649, filed Dec. 28, 1961 in the names of S. Silberg and R. D. Slayton, now Patent No. 3,242,461. That application discloses an error detection and correction system in which information is transmitted in blocks having a predetermined number of characters. At the end of each block the transmitter sends a parity check character which is compared at the receiver with a locally generated parity check character based on the received block of information. Following the transmission of the parity check character, the transmitter waits for verification from the receiver that the previous block was free of errors or a signal from the receiver indicating that the previous block contained an error. If the receiver indicates that the previous block was error free, the transmitter then transmits the next succeeding block after the transmission of which it again waits for a signal from the receiver. If, however, a signal from the receiver indicates that an error existed in the previous transmitted block, the tape at the transmitter is pulled back to the beginning of the errored block which then is retransmitted. During normal error free transmission, this type of operation results in a waste of line time inasmuch as the transmitter must wait for a verification signal from the receiver at the end of each block before resuming transmission of the next succeeding block.

Systems have been developed in the prior art which provide for continuous transmission of information encoded in some type of error detection code; and in which the receiver signals the transmitter as soon as an error is received, whereupon the transmitter retransmits a predetermined number of characters following the receipt of the error indication signal from the receiver. In the event that line breaks or disconnects should occur during transmission from either the transmitting station or the receiving station, such prior art systems do not provide any means for assuring that no information will be repeated or that no information will be omitted or lost upon resumption of transmission.

It is an object of this invention to obtain block synchronization between the sending and receiving stations in an automatic error detection and correction system following accidental line disconnects of the transmission lines interconnecting the stations.

It is another object of this invention, whenever a line disconnect or a stop signal interrupts transmission, to release a previously transmitted block of information from storage at the sending station, if such a block has not been released from storage previously, prior to pulling back the tape at the sending station in preparation for retransmission of the interrupted block of information.

Another object of the invention is to feed out a length of tape at the receiving station sufficient to complete a block of information whenever a block is interrupted by a line disconnect whereupon the interrupted block then is cancelled from the recorded medium through the over recording of a delete signal while the retransmitted block is simultaneously rerecorded at the receiving sttaion.

Yet another object of the invention is to synchronize the driving of the recording device and the deleting device at the receiver whereby a length of tape equal to one message block is continually maintained between the devices.

In accordance with the invention a tape reader at the sending station transmits binary digits (bits) having one of two conditions to a receiving device (perforator) at the receiving station. Parity counters at each station count the bits of one condition occurring at the respective stations during the block. A character counter at each station counts the number of characters transmitted or received, respectively; and after counting a predetermined number of characters equal in number to the length of a block, the character counter initiates the sending of the count made in the parity counter at the sending station and the receiving station compares the transmitted parity check character with a locally created parity check character stored by the parity counter at the receiving station. If the two parity check characters are the same, the receiver continues to receive the next block of information from the sending station which continuously transmits the information in its tape. If there is lack of agreement between the parity check characters at the receiver, the receiving station sends a rerun signal to the sending station notifying it to retransmit the prior block of information. At the same time, the receiver is blinded to any signals from the next succeeding block of information which is being transmitted by the sending station at the time the receiving station is notifying the sending station of the error. A discrete signal is sent by the receiving station to the sending station designating that a rerun is requested, and the transmitter compares this signal with a locally produced fixed signal of the same type to ascertain whether or not a valid rerun signal has been received. This is done in order to prevent erroneous retransmission due to noise or other causes.

A provision also is made for the receiving station to send a stop signal to the sending station during transmission of a block whereupon the receiving station feeds out tape equal in length to finish the interrupted block; and the sending station upon subsequent receipt of a rerun signal is caused to retransmit the interrupted block only, distinguishing this stop signal followed by a rerun from a rerun signal in the absence of a stop signal which causes the sending station to retransmit the previously completely transmitted block. This operation is accomplished by sending a discrete stop signal from the receiving station to the sending station where the stop signal controls the tape pull back mechanism and storage feedout mechanism to allow only retransmission of the interrupted block of information.

If a line disturbance on the telephone line causes a disconnect during the first half of a block, the receiving station is blinded and on re-establishment of the line meters out a length of tape sufficient to complete the block. At the transmitter the previously transmitted block is released from storage after which the tape corresponding to the interrupted block is pulled back to the beginning of the interrupted block. The system then retransmits the interrupted block upon reconnection of the circuit, while at the receiver the interrupted block is deleted simultaneously during receipt of the retransmission of that block.

If a line disconnect occurs in the second half of a block of information, the release of the previously transmitted block at the sending station already has occurred; so that at the sending station the tape is pulled back to tight-tape causing the first character of the interrupted block to be in position for retransmission. At the receiving station the remainder of the interrupted block is metered out as before; and when retransmission is resumed, the interrupted block is deleted simultaneously during receipt of the retransmitted block.

Other features and objects of the invention will become apparent to those skilled in the art from the following detailed description of the system considered in conjunction with the accompanying drawings wherein:

FIG. 2 is a partial side elevational view of the pull back tape reader or transmitter distributor used on the sending station;

FIGS. 3 and 4 are views of the signal generator used at the sending and receiving stations;

*General description*

Figure 1:
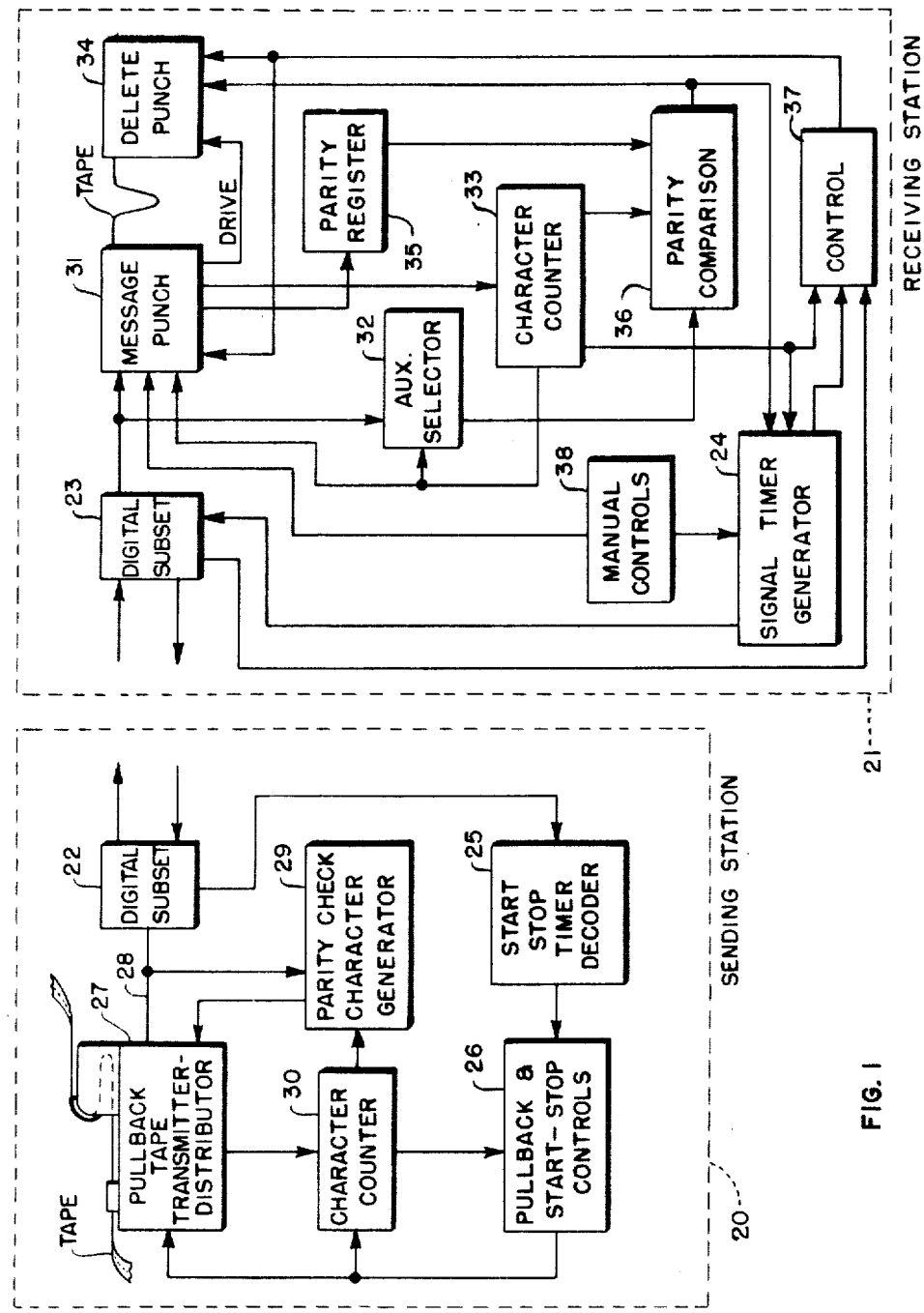
FIG. 1 is a block diagram of the system according to the invention.
Figure 5:
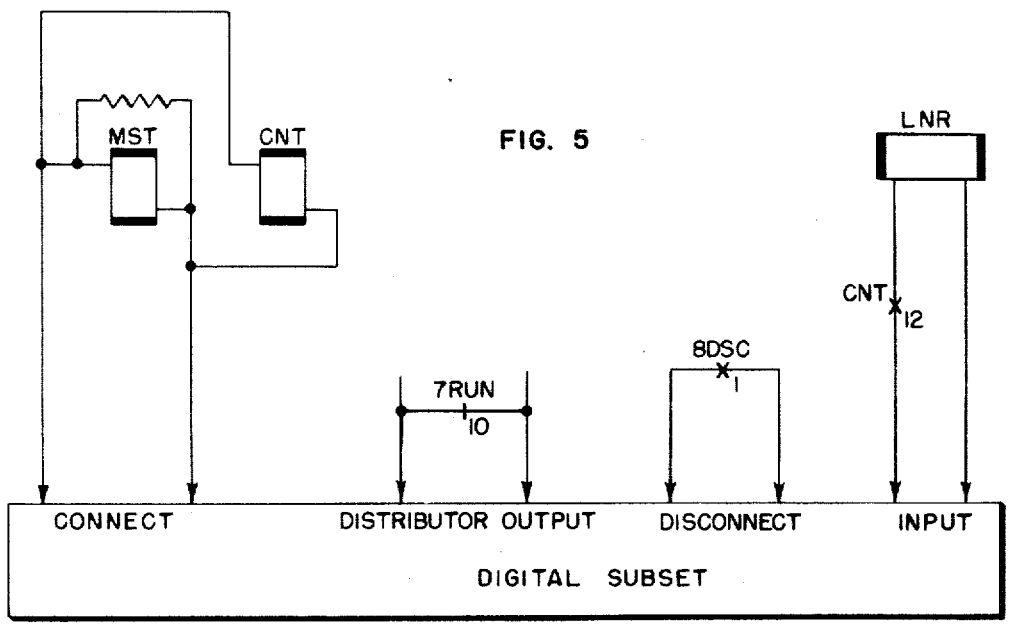
FIGS. 5 through 8 are detached contact schematic circuit diagrams of the control circuits at the sending station.

Referring now to FIG. 1 there is shown in block form a preferred embodiment of the error detection and correction system of the invention having a sending station generally indicated at 20 and a receiving station indicated at 21. The sending and receiving stations are interconnected through telephone digital subsets which will transmit in two directions serially and simultaneously, neither direction affecting the other, with features of being able to manually disconnect and having an output indication of readiness to transmit.

When it is desired to initiate transmission from the sending station to the receiving station the operator at the sending station makes a telephone connection through the digital subset 22 at the sending station to the digital subset 23 at the receiving station. After a telephone connection has been made and following a predetermined time interval, a signal timer 24 at the receiving station generates a start signal which is supplied through the digital subsets 23 and 22 to a start-stop timer decoder 25 at the sending station. In the decoder 25 the signal received by the sending station is compared with a locally produced fixed start signal; and if a valid start signal is received, the decoder 25 activates a pull back and start-stop control circuit 26 which in turn causes a pull back tape transmitter-distributor 27 to pull back any tape which it may have in storage to a tight-tape condition. This pull back tape transmitter-distributor 27 is a modified version of the tape transmitter-distributor disclosed in the copending application No. 135,857, filed Sept. 5, 1961 in the names of D. E. Huffman, P. P. Petros, and W. J. Zenner, now Patent No. 3,124,643. The modifications made are discussed later with reference to FIG. 2.

After the pull back tape transmitter 27 pulls its tape to a tight-tape condition, transmission through line 28 and the digital subsets 22 and 23 to the receiving station 21 commences. At the same time, the signals supplied to the digital subset 22 also are monitored by a suitable parity character generator 29 which may be of the type disclosed in either of the copending applications No. 190,042, filed Apr. 25, 1962 in the name of G. K. Burns now Patent No. 3,234,365 or No. 190,043, filed Apr. 25, 1962 in the name of R. D. Scott now Patent No. 3,234,510. The function of the parity character generator 29 is to supply a parity check character at the end of each block of transmitted information. A character counter 30 which may be of any suitable type, preferably a stepping switch, counts each character transmitted by the pull back tape reader. The count generated by the character counter is utilized to control the pull back and start-stop control circuit 26 and to cause the output of the parity character generator 29 to be supplied to the distributor of the pull back transmitter at the end of each block.

In the preferred embodiment of this invention a block of information contains 72 characters, and the pull back transmitter 27 is provided with a run-out feed wheel which is controlled to give metered run-out of the tape stored between the reading feed wheel and the run-out wheel upon receipt of signals from the pull back and start-stop control circuit 26 which is controlled by the output of the character counter 30. During the first block of information, no such signals are supplied to the pull back transmitter 27. At the end of the first block, the character counter 30 supplies a signal to the pull back and start-stop control circuit 26 which causes the tape reader 27 to stop reading tape. At the same time the character counter 30 causes the parity check signal generated by the parity character generator 29 to be supplied to the distributor portion of the pull back tape transmitter 27 from which it is distributed over the line 28 and through the digital subsets 22 and 23 to the receiving station. After the parity check character has been distributed, the tape reader 27 is released and continues transmission of the succeeding block of information.

At the receiver following completion of a telephone connection, the signal timer generator 24 causes a start signal to be supplied to the digital subset 23 after a predetermined time delay. As stated previously, this start signal is compared with a locally produced fixed signal in the start-stop timer decoder 25 at the sending station in order to determine whether or not a valid start signal requiring the transmission of data has been received at the sending station. When the sending station begins transmitting the first block of information, the incoming signals are supplied by the digital subset 23 in parallel to a message punch 31 and an auxiliary selector 32. A character counter 33 causes the auxiliary selector 32 to be blinded to these incoming signals and allows the message punch 31 to record the signals supplied by the digital subset 23 in paper tape. The tape extends from the message punch to a delete punch 34, and the length of tape between the two punches is chosen to cause exactly one block of information to be stored between the two punches. The delete punch 34 is driven in synchronism with the message punch 31, but it is normally prevented from punching the tape passing through it. This operation is more fully described in the afore-mentioned copending application No. 162,649.

The character counter 33 counts each character received by the message punch 31 in a manner similar to the operation of the character counter 30 at the sending station. The information perforated in the tape by the message punch also is supplied to a parity register 35 which may be similar in all respects to the parity character generator 29 at the sending station. At the end of a block of information just prior to the receipt of the parity check character from the sending station, the character counter 33 causes the message punch 31 to be blinded to incoming signals thereby preventing the message punch 31 from recording the parity check character; and at the same time, the auxiliary selector 32 is allowed to respond to the incoming parity check character. The character counter controls a parity comparison circuit 36 at the end of the block and allows the output of the auxiliary selector 32 to be compared in the parity comparison circuit 36 with the locally created parity check character supplied at the output of the parity register 35. If the parity check characters are the same, no output is obtained from the parity comparison circuit 36; and the next operation of the character counter causes the auxiliary selector 32 once again to be blinded to incoming signals and allows the message punch 31 to be responsive to the incoming signals which form the next succeeding block of information.

In the event that the comparison of the parity check characters fails in the parity comparison circuit 36, an output signal is supplied from the parity comparison circuit 36 to the delete punch 34 to enable that punch to perforate delete characters. At the same time, the signal timer generator circuit 24 is energized and causes a rerun signal to be supplied to the digital subset 23 from which it is transmitted to the sending station where it is applied to the start-stop timer decoder 25. The output of the decoder 25 causes the pull back tape transmitter 27 to cease transmission of data and to pull back the tape and rerun the errored block of information. At the receiver, the outputs of the character counter 33 and the signal timer generator 24 are applied to a control circuit 37 which causes the message punch 31 to be blinded to incoming signals until the end of the rerun signal from the timer generator 24. At the end of this period, the message punch 31 is allowed to respond to the incoming retransmitted block of information while the delete punch 34 simultaneously perforates over the errored block with delete characters. At the end of the retransmitted block, the delete punch 34 once again is rendered inoperative so that the error-free tape is allowed to pass through the delete punch unchanged.

If it is desired at the receiver to manually stop transmission for any reason, a manual control 38 is operated which energizes the signal timer generator 24 and causes it to supply a stop signal through the digital subset 23 to the sending station where it is recognized by the start-stop timer decoder 25. The output of the start-stop timer decoder 25 at the sending station is applied to the pull back and start-stop control circuit which causes transmission of additional tape to stop. At the receiver, the outputs of the signal timer generator 24 and the character counter 33 cause the control circuit 37 to blind the message punch 31 to the incoming line and to feed out a length of tape sufficient to complete the interrupted block of information. The delete punch 34 also is enabled to perforate delete characters in the tape for a length of one block following resumption of transmission.

After a stop signal has occurred, resumption of transmission is initiated by closure of a start button in the manual control circuit 38 which causes the signal timer generator 24 to supply a start signal through the digital subset 23 to the sending station. Depending upon the count stored in the character counter 30 which also is supplied to the control circuit 26, the output of the start-stop timer decoder 25 at the sending station causes the previous block of information to be run out of storage if this has not already occurred. If the previously stored block has been run out of storage prior to the receipt of the stop signal, operation of the run-out wheel is prevented. Then normal transmission resumes.

If a line disturbance on the telephone line causes a disconnect during transmission of a block, the disconnect signal is supplied from the subset 23 to the control circuit 37 which causes the message punch 31 to be blinded and upon reconnection, to meter out a length of tape sufficient to complete the block. In a manner similar to operation following a stop signal, the delete punch is enabled; so that when transmission is resumed, the interrupted block of information is deleted from the tape by the delete punch 34. At the transmitter, the disconnect signal from the digital subset 22 is applied to the start-stop timer decoder 25, the output of which is applied to the pull back and start-stop control circuit 26 causing the control circuit 26 to stop transmission. Upon reconnection and receipt of a valid rerun signal in start-stop timer decoder 25, the character counter 30 causes the pull-back tape transmitter-distributor 27 to run out the previously completely transmitted block if this has not already occurred. The tape then is pulled back to a tight-tape condition and the tape transmitter 27 begins to retransmit the interrupted block. If the previous block already has been run out of storage, the pull back and start-stop control circuit 26 prevents further run out from being initiated; and the tape merely is pulled back to a tight-tape condition and the transmitter 27 begins retransmission of the interrupted block.

*Transmitter*

The transmitter used in this system is a modification of the pull back tape transmitter disclosed in the previously mentioned Huffman-Petros-Zenner patent application, and the specification of that application should be referred to for a detailed explanation of the operation of the pull back tape transmitter. The modifications which have been made to the pull back tape transmitter of the Huffman-Petros-Zenner application are shown in FIG. 2.

The run-out feed wheel 40 of the pull back tape transmitter normally is blocked against rotation by the run-out magnet 41 which, in its deenergized condition, holds the shoulder 42 of an escapement lever in the path of a single toothed wheel 43 fixed to the shaft 44 of the run-out wheel 40. Energization of the run-out magnet 41, however retracts the shoulder 42 of the escapement lever from engagement with the tooth of the wheel 43 and allows the wheel 40 to rotate counterclockwise to feed tape to the left. This operation continues until the tooth of the wheel 43 comes into engagement with the shoulder 45 of the escapement lever which is moved into the path of the tooth of the wheel 43 when the run-out magnet is energized, thereby allowing the feed wheel 40 to rotate through one-half a revolution.

Upon deenergization of the run-out magnet 41, the escapement lever is rotated clockwise by the urging of a spring 46; and the shoulder 45 is pulled out of the path of the tooth allowing the feed wheel to complete its revolution whereupon the shoulder 42 of the escapement lever blocks the tooth of the wheel 43 preventing any further rotation until the next operation of the run-out magnet 41. A locking lever 47 prevents the tooth on the wheel 43 from bouncing or causing a reversal of the wheel 40 when the tooth hits the shoulder 42 of the escapement lever.

Another modification of the transmitter disclosed in the afore-mentioned Huffman-Petros-Zenner application is in the addition of a cam 48 which is mounted on the end of the shaft 44 to operate a normally closed pair of switch contacts M. When the feed wheel 40 is in the rest position shown in FIG. 2, the flat portion of the cam 48 is in the position shown; and the switch M is closed. During the rotation of the shaft 44 and the feed wheel 40, the cam 48 causes the switch M to be opened until the feed wheel 40 is rotated through a complete revolution with the projection on the wheel 43 once again resting on the upper shoulder 42 of the escapement lever. At this time the cam 48 is returned to the position shown on the drawing and the contacts M once again are closed. The significance of this operation will be explained in the subsequent description of the operation of the control circuit of this invention.

In all other respects the tape transmitter used in the system of this invention is identical to the tape transmitter disclosed in the Huffman-Petros-Zenner application, and for that reason a detailed description of the tape transmitter will not be made here.

Signal timer

At both the sending station and the receiving station, a signal timer or signal generator is provided for furnishing a plurality of different control signals for use in the operation of the circuit of this invention. Any suitable signal generator capable of simultaneously generating a plurality of signals may be used, and a preferred embodiment of such a signal generator is shown in FIGS. 3 and 4. Basically, the signal generator is comprised of a printed circuit disk or wheel 50, on the surface of which are printed a plurality of tracks 51 consisting of conductive and nonconductive portions. A plurality of brushes 52 equal in number to the number of tracks on the disk 50 are mounted in a brush holder 53 which positions each of the brushes 52 over a single track on the disk 50. The disk 50 is rotated by a synchronous clock motor 54 (FIG. 4) which rotates at a relatively slow speed of approximately one revolution in three seconds.

Normally the disk 50 is prevented from rotating by a relay 55, which in its released condition allows an extension 56 on its armature to engage a slot 57 in the disk 50. At the same time, another extension 58 on the armature causes a pair of switch contacts 59 to remain in their normally open position. The contacts 59 control the power supply to the timer motor 54; so that when the contacts 59 are open, the timer motor 54 is in the deenergized condition.

Whenever the relay 55 is operated by a control signal, to be more fully explained subsequently, the armature comprising the extensions 56 and 58 is caused to pivot counterclockwise (as viewed in FIG. 4) about the axis 60; so that the extension 56 is pulled out of engagement with the slot in the disk 50; and the right-hand end of the extension 58 closes the contacts 59. This energizes the motor 54 and causes the disk 50 to be rotated. The extension 56 then rides on the right-hand side of the disk 50, as viewed in FIG. 4, and causes the armature with extensions 56 and 58 to remain in its operated position. Therefore, although the relay 55 is released during the time that the disk is rotating, the contacts 59 are not opened since these contacts are held closed by the operation of the disk 50 on the extension 56 of the armature. When the slot 57 once again returns to its original position, the extension on the armature 56 is urged into the slot 57 by the action of a spring 61 thereby preventing further rotation of the disk 50; and at the same time, the contacts 59 are opened, deenergizing the motor 54.

It is to be noted that the signal generators at the receiving station and the sending station of this system are of similar construction with the exception that the signal generator at the sending station has two identical patterns per revolution; and instead of a single slot 57 as shown in FIG. 3, a pair of slots 57 spaced 180° apart are provided. Thus, the disk 50 at the sending station rotates one-half a revolution each time the relay 55 is energized instead of rotating a full revolution as it does at the receiving station.

When the brushes 52 engage a conductive portion of their respective tracks, an electrical contact is closed or made; and when the brushes engage a nonconductive portion, this contact is opened. It is obvious that the disk 50 and brushes 52 could be replaced with cam operated contacts or any other suitbale apparatus if so desired. The invention is not to be construed as limited to the use of the particular type of signal generator shown in FIGS. 3 and 4.

Figure 6:
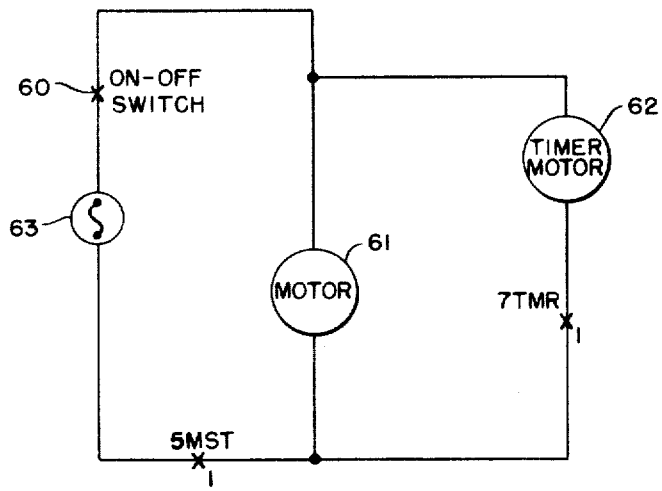
Figure 7:
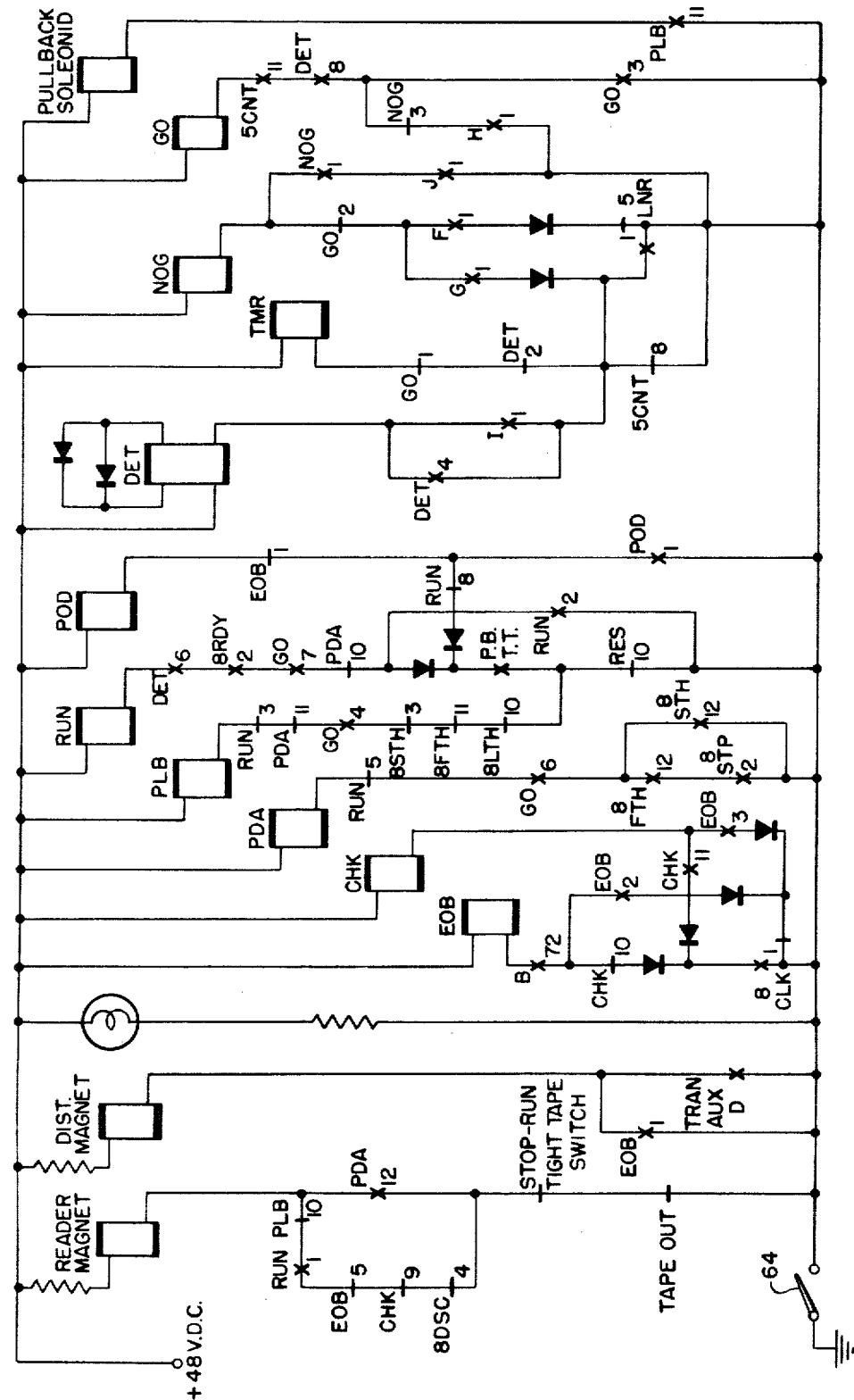

In the description of FIGS. 3 through 11 the "detached contact" method of exposition used in Patent No. 2,722,675 granted to J. Michal et al. on Nov. 1, 1955 has been adopted for use. In the "detached contact" method, relay contacts generally are not adjacent to their magnetic cores and windings but are separated or detached therefrom. For example, the core of the run relay shown on FIG. 7 is represented by a small rectangle and given a functional designation such as "RUN." In the specification this relay is referred to as "7–RUN" where "7" indicates the figure number of the drawing on which the core is located and "RUN" signifies "run" as the functional designation of the relay. On the drawing each of the contacts controlled by the relay and shown on the same figure as the winding is given a designation such, for example, as "RUN–3" placed in proximity to the contacts where the "RUN" indicates that the contacts are controlled by the winding of the relay "RUN" located on the same figure. When the relay also has contacts located on another figure of the drawing the contacts are given a compound designation such, for example, as "7–RUN–6," where "7" indicates the figure number of the drawing on which the core is located and "6" is the number of the contacts. In the specification the contacts are referred to as "8–7–RUN–6" where "8" indicates the figure number on the drawing on which the contacts are located, "7" indicates the figure number of the drawing on which the core is located, "RUN" is the functional designation of the relay, and "6" is the contact number.

Contacts which are closed when the relay is deenergized, known as "break" contacts, are represented by a short line perpendicular to the line representing the conductor, while contacts which are closed when the relay is energized, known as "make" contacts, are represented by two short crossed lines diagonally intersecting the conductor line. A "break" and "make" contact connected together on one side, in close proximity to each other and with the designation C indicates a set of "continuity" or "make-before-break" contacts. Similarly the normally open and normally closed contacts of keys or push buttons are shown in a manner similar to that used in designating relay contacts. The other circuit elements are shown in the conventional manner employed heretofore.

Since in many instances, the "detached contact" method of exposition results in a drawing where the circuit elements have no apparent physical connection one with the other, it is to be assumed that all of the subject matter appearing within the confines of a single sheet of patent drawing constitutes a single patent figure unless otherwise indicated. When the subject matter on a sheet of patent drawing includes more than one figure, the subject matter of each figure is identified by a separate figure number.

Sending station—start up sequence

Referring now to FIG. 6, when it is desired to transmit information from the sending station, the operator manually closes a switch 60 which prepares a path for energizing the tape transmitter motor 61 and the timing motor 62 from a suitable source 63 of alternating current upon subsequent operations of the relays 6–MST and 7–TMR. Manual switches 64 (FIG. 7), 65 (FIG. 8), and the push button (FIG. 8) also are closed to prepare the DC operating paths for the relays used in the control circuit of this system. Closure of the switch 65 causes the relay 8–FTH to be operated through a path extending from ground through the switch 65, through the now closed break contacts C–72, 8–RES–9, 8–LTH–12, 8–STH–4, and the coil of the relay FTH to a positive source of DC voltage. At the same time, the relay 8–RDY is operated through a path extending from ground through the now closed push button contact and the coil of the relay to a positive DC source. The relay 8–RDY then locks operated through its own make contact 8–RDY–1. At this point, the telephone connection between the digital subset at the sending station is made with the digital subset at the receiving station; and this causes the relays 5–MST and 5–CNT to be energized. At the same time, the return channel from the receiving station goes into a steady marking condition and causes the line relay 5–LNR to be energized. The system now is ready for the receipt of a start signal from the receiver.

*Sending station—start operation*

Figure 12:
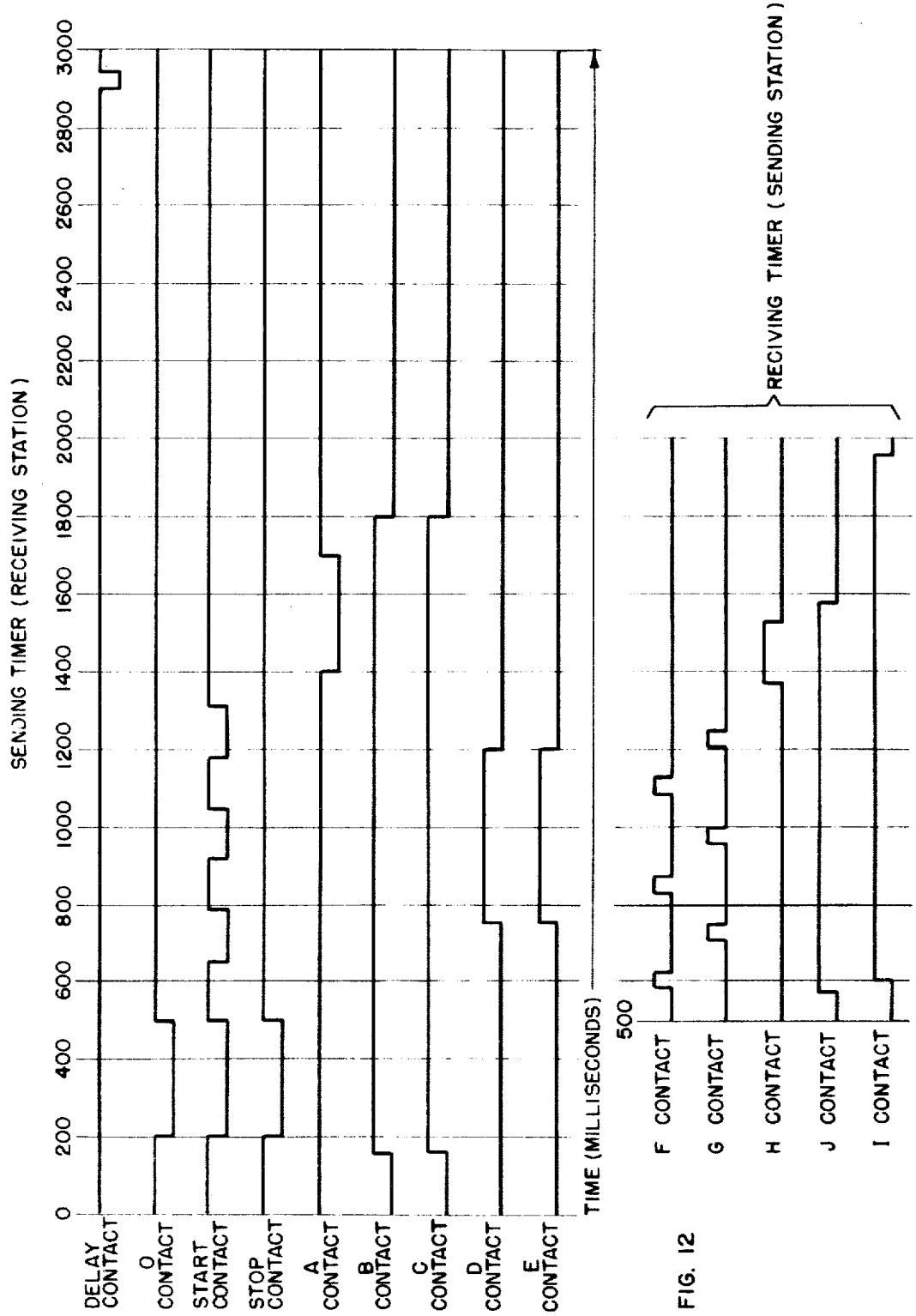
FIG. 12 is a timing diagram useful in explaining the operation of the system.

Forgetting for a moment the operation of the system at the receiving station, it is sufficient to note that when a start signal is to be supplied to the sending station by the receiving station, this signal is generated by the start contacts on the sending timer at the receiving station (see FIG. 12). As soon as the first long space of the start signal is received by the sending station, the line relay 5–LNR is released thereby breaking the energizing path for the slow release relay 7–DET by opening the make contact 7–5–LNR–1. It is to be noted that the previous operation of the relay 5–CNT opened the break contact 7–5–CNT–8. The time for release of the relay 7–DET is chosen to be slightly less than the duration of the first spacing signal supplied by the start contacts of the sending timer at the receiving station. Therefore, the relay 7–DET is released prior to the receipt of the first marking signal in the start signal sequence.

When the first marking signal of the start signal sequence is received, the relay 5–LNR once again is operated closing the contact 7–5–LNR–1 thereby completing an operating path to the timing relay 7–TMR which extends from ground through the now closed make contact 7–5–LNR–1, the now closed break contacts 7–DET–2 and 7–GO–1, and the winding of the relay 7–TMR to the source of positive potential. Operation of the relay 7–TMR (similar to relay 55 of FIG. 4) causes the make contact 6–7–TMR–1 to be closed thereby energizing the timing motor 62. As stated previously in the discussion of FIGS. 3 and 4, this causes a timing disk to rotate and the outputs of the different brushes of the timing disk at the sending station are shown in FIG. 12 and are designated F, G, H, J and I. With reference to FIG. 12 when the I contact on the timing disk of the sending station timer is closed, the detect relay 7–DET is operated over a path extending from ground, through the now closed make contact 7–5–LNR–1, the now closed make contact 7–I and the coil of the slow release relay 7–DET to the source of positive potential. Operation of the relay 7–DET opens the break contacts 7–DET–2 thereby releasing the relay 7–TMR. This in turn, allows the make contact 6–7–TMR–1 to be opened at the end of the cycle of signals shown in FIG. 12 for the sending station when the armature operated by the relay 7–TMR falls into the slot on the timing disk 50 (FIG. 3) of the signal generator at the sending station.

The relay 5–LNR is operated and released in sequence in accordance with the signal pattern generated by the start contacts at the receiver as shown in FIG. 12. The relay 7–DET is not released during this operation, however, since at no time is a spacing signal applied to the relay LNR which is longer than the release time of the slow release relay 7–DET. The contacts 7–F and 7–G on the timing disk of the receiving timer at the sending station are alternately opened and closed as shown in FIG. 12 to sample the received start signal which operates the relay 5–LNR. It is to be noted that the contact 7–F–1 is closed when the relay 5–LNR is operated opening the break contact 7–5–LNR–5; and that the contact 7–G–1 is closed when the relay 5–LNR is released opening the make contact 7–5–LNR–1; so that at no time during receipt of a valid start signal is a path completed through this exclusive OR gate for energizing the relay 7–NOG.

As a consequence, when the cycle of the timer reaches the point that the contact 7–H–1 is closed (see FIG. 12), the relay 7–GO is operated over a path extending from ground through the now closed make contact 7–H–1, the now closed break contact 7–NOG–3, the now closed make contacts 7–DET–8 and 7–5–CNT–11, and the coil of the relay 7–GO to the source of positive potential. The relay 7–GO holds itself operated through its own make contacts 7–GO–3. Operation of the relay 7–GO completes a path for operating the reset relay 8–RES over a path extending from ground through the now closed break contacts 8–C–72, 8–7–RUN–6 and 8–7–PDA–9, the now closed make contact 8–7–GO–5, and the coil of the relay 8–RES to the source of positive potential. The character counter magnets (FIG. 8) then are energized through the interrupter contact (FIG. 8) by the closure of the make contact 8–RES–2.

The character counter magnets are used to operate a conventional stepping switch and, as is well known, the operation of such a switch through its own interrupter contacts causes it to step rapidly through its cycle. As a consequence, the character counter is stepped through its entire cycle until the 72nd or last count is reached, at which time the contact 8–C–72 is opened. This causes the character counter magnets to be deenergized and further releases the relays 8–RES and 8–FTH. When this occurs, the pull back relay 7–PLB is operated over a path extending from ground through the now closed break contacts 7–8–RES–10, 7–8–LTH–10, 7–8–FTH–11 and 7–8–STH–3, the now closed make contact 7–GO–3, the now closed break contacts 7–PDA–11 and 7–RUN–3, and the coil of the relay 7–PLB to the source of positive potential.

When the relay 7–PLB is operated, the pull back solenoid is energized by the closure of the make contact 7–PLB–11. This causes the tape transmitter to pull back to a tight-tape condition in a manner which is explained in detail in the afore-mentioned Huffman-Petros-Zenner application. When the tape is pulled back to a tight-tape condition, the make contact PB–TT (FIG. 7) is closed providing an operating path for the run-out delete relay 7–POD extending from ground, through the now closed break contact 7–8–RES–10, the contact PB–TT, the now closed break contacts 7–RUN–8 and 7–EOB–1, and the coil of the relay POD to the source of positive potential. The relay 7–POD then locks operated through its own make contacts 7–POD–1. Operation of the relay POD prevents the run out of a block in storage during transmission of the first block of information by the sending station by opening the break contact 8–7–POD–2 in the energizing path for the run-out solenoid 8–ROS.

Closure of the contact PB–TT (FIG. 7) also completes an operating path for the run relay 7–RUN extending from ground through the now closed break contact 7–8–RES–10, the contact PB–TT, the now closed break contact 7–PDA–10, the now closed make contacts 7–GO–7, 7–8–RDY–2 and 7–DET–6, and the coil of the relay 7–RUN to a source of positive potential. Energization of the relay 7–RUN sets up the sending station for normal transmission of information by opening the break contact 7–RUN–3 to release the pull-back relay 7–PLB causing the pull-back solenoid to be deenergized when the make contact 7–PLB–11 opens. At the same time, the reader clutch magnet in the pull-back tape transmitter is energized over a path extending from ground through the now closed tape out and tight-tape contacts, the now closed break contacts 7–8–DSC–4, 7–CHK–9 and 7–EOB–5 the now closed make contact 7–RUN–1, the now closed break contact 7–PLB–10, and the reader clutch magnet coil to a source of positive potential.

The sending station now transmits the first block of information to the receiving station. The distributor clutch magnet is pulsed through the transmitter auxiliary contact D; and, in turn operation of the distributor causes closure of the distributor auxiliary contact A (FIG. 8) once for each transmitted character thereby pulsing the clock relay 8–CLK once during each character. The operation of the relay 8–CLK has no effect on the control system of this invention until the end-of-block sequence occurs as will be more fully explained subsequently. The parity generator, however, is stepped by operation of the relay 8–CLK. In a like manner, the transmitter auxiliary contact B (FIG. 8) is closed and reopened once during each character read by the reader to pulse the character counter magnets (FIG. 8) once during each character.

The character counter magnets drive a conventional stepping switch having 72 positions corresponding to the 72 characters arbitrarily chosen as a block length for this system. An electronic counter could be used equally as well, and it is to be noted that the invention may be adapted to longer or shorter blocks with no change in its scope.

During the first 30 characters transmitted by the sending station, the first third relay 8–FTH is operated through a path previously described. When the character counter magnets drive the character counter stepping switch to its 30th position, the contact 8–C–30 is closed, completing a path extending from ground through the now closed break contact 8–C–72, the now closed break contact 8–RES–9, the now closed make contact 8–C–30 and the coil of the second third relay 8–STH to a source of positive potential to operate the relay 8–STH. Operation of the relay 8–STH causes release of the relay 8–FTH by opening the break contact 8–STH–4. The relay 8–STH locks in its operated condition through its own now closed make contact 8–STH–5 and the now closed break contact 8–LTH–9. The system remains in this mode of operation until the stepping switch reaches its 48th position whereupon the make contact 8–C–48 is closed completing a path extending from ground through the now closed break contact 8–C–72, the now closed break contact 8–RES–9, the now closed make contact 8–C–48 and the winding of the last third relay 8–LTH to a source of positive potential to operate the relay 8–LTH which then locks operated through its own make contact 8–LTH–11. Operation of the relay 8–LTH causes the relay 8–STH to be released by the opening of the break contact 8–LTH–9. It should be noted that during the transmission of the first block, the closure of the contacts C30 and C48 does not operate the run-out solenoid 8–ROS because the relay 7–POD remains operated throughout the block causing the break contact 8–7–POD–2 to be open during this period.

After the 72nd character of the block, the check character being generated in the parity counter at the sending station must be transmitted over the line. When the 72nd position or step of the character counter stepper switch is reached the make contact 7–B–72 is closed allowing the end-of-block relay 7–EOB to operate when the next operation of the relay 8–CLK occurs. The operating path extends from ground through the now closed make contact 7–8–CLK–1, the now closed break contact 7–CHK–10 the now closed make contact 7–B–72 and the winding of the relay 7–EOB to a source of positive potential. When the relay 8–CLK releases, the relay 7–EOB remains operated through its own make contact 7–EOB–2 and the now closed break contact 7–8–CLK–1. At the same time, the check relay 7–CHK is operated through a path extending from ground through the now closed break contact 7–8–CLK–1, the now closed make contact 7–EOB–3, and the winding of the relay 7–CHK to a source of positive potential. While either the relay 7–EOB or 7–CHK is operated, the normal operating ground path for the reader magnet is broken by the opening of the break contacts 7–EOB–5 or 7–CHK–9. This stops reading of the tape and prevents further operation of the character counter since the transmitter auxiliary contact B (FIG. 8) now is held open. Although reading of the tape now has stopped, the check character generated by the parity character generator still must be distributed; and for this reason, the make contact 7–EOB–1 is placed in series with the distributor magnet to provide a path for maintaining the distributor magnet energized until the relay 7–EOB is released.

The check character itself is registered in the parity character generator which may be of any suitable type such as that disclosed in the afore-mentioned Silberg-Slayton, Burns, or Scott applications; and the manner in which this check character is formed constitutes no part of this invention and will not be discussed here. The check character is supplied to the distributor by the operation of the check relay 7–CHK in any suitable manner such as is disclosed in the afore-mentioned Silberg-Slayton application and forms no part of the present invention. The clock relay 8–CLK once again is operated by momentary closure of the distributor auxiliary contact A (FIG. 8) during the check character cycle causing the relay 7–EOB to be released by the opening of the break contact 7–8–CLK–1. When the relay 8–CLK releases upon opening of the auxiliary distributor contact A, the relay 7–CHK is released by the opening of the make contact 7–CLK–1. As soon as the relays 7–EOB and 7–CHK are released, the normal operating path for the reader magnet is once against established by the closure of the break contacts 7–EOB–5 and 7–CHK–9; and normal reading and transmitting of the next succeeding block of information takes place with the end-of-block sequence being repeated at the end of each block.

It is to be noted, however, that operation of the relay 7–EOB at the end of the first block opens the break contact 7–EOB–1 in the operating path for the relay 7–POD thereby releasing the relay 7–POD at the end of the first block of information. As a consequence, during normal transmission of the next succeeding block of information, the afore-mentioned sequence of operation occurs with the exception that when the character counter reaches the 30th character and the make contact 8–C–30 is closed, the run-out solenoid 8–ROS is energized over a path extending from ground through the now closed break contact 8–C–72 and 8–RES–9, the now closed make contact 8–C–30, the now closed break contact 8–7–POD–2 and the coil of the run-out solenoid 8–ROS to a source of positive potential.

The run-out solenoid 8–ROS is the same as the run-out magnet 41 shown in FIG. 2, and its operation and subsequent release, when the 31st character is reached causing the contact 8–C–30 to once again open, allows one revolution of the run-out wheel 40 (FIG. 2) on the pullback tape transmitter to occur. The number of feed pins on the run-out feed wheel 40 is chosen to be 36 so that one-half of the previous block of information is released from storage by operation of the run-out wheel when the 30th character is reached. In a similar manner when the 48th character is reached the contact 8–C–48 is closed causing operation of the run-out solenoid 8–ROS; and the remainder of the first block of information, that is, the last 36 characters of the block are removed from storage by the run-out wheel. After the 48th character, therefore, the only information stored between the run-out feed wheel and the tape reading feed wheel of the tape transmitter is information of the second block. So long as normal error free transmission occurs the above sequence of operation is repeated, with operation of the run-out feed wheel 40 (FIG. 2) occurring only on the 30th and 48th characters of a block to remove the previously transmitted block from storage.

It should be noted that the parity character generator is cleared at the end of each block in a suitable manner by the operation of the relay 7–CHK and the clock relay 8–CLK. This operation may be of the type disclosed in the afore-mentioned Silberg-Slayton application and forms no part of this invention.

*Receiving station—start operation*

Figure 9:
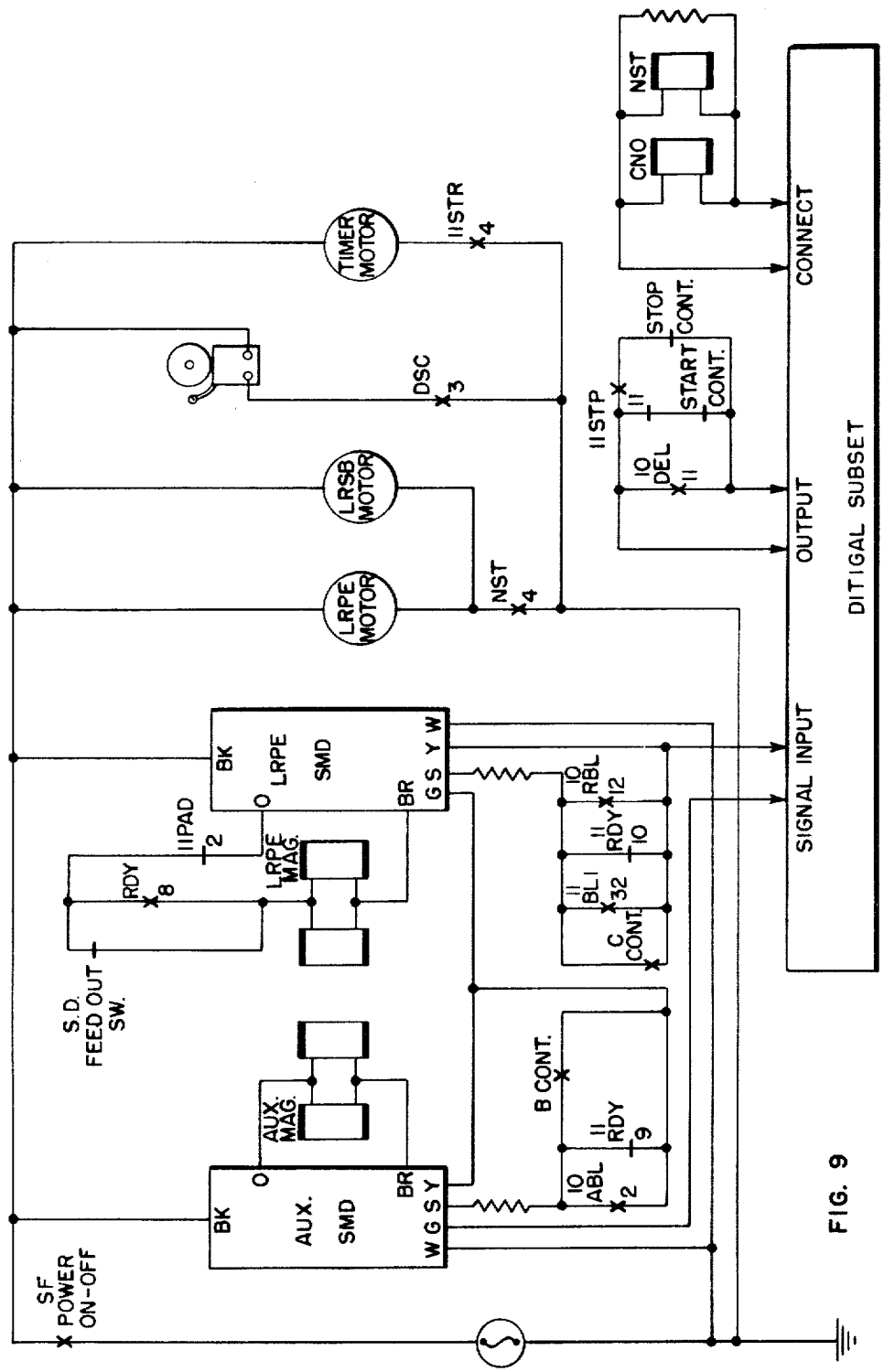
FIGS. 9 through 11 are detached contact schematic circuit diagrams of the control circuits at the receiving station.
Figure 10:
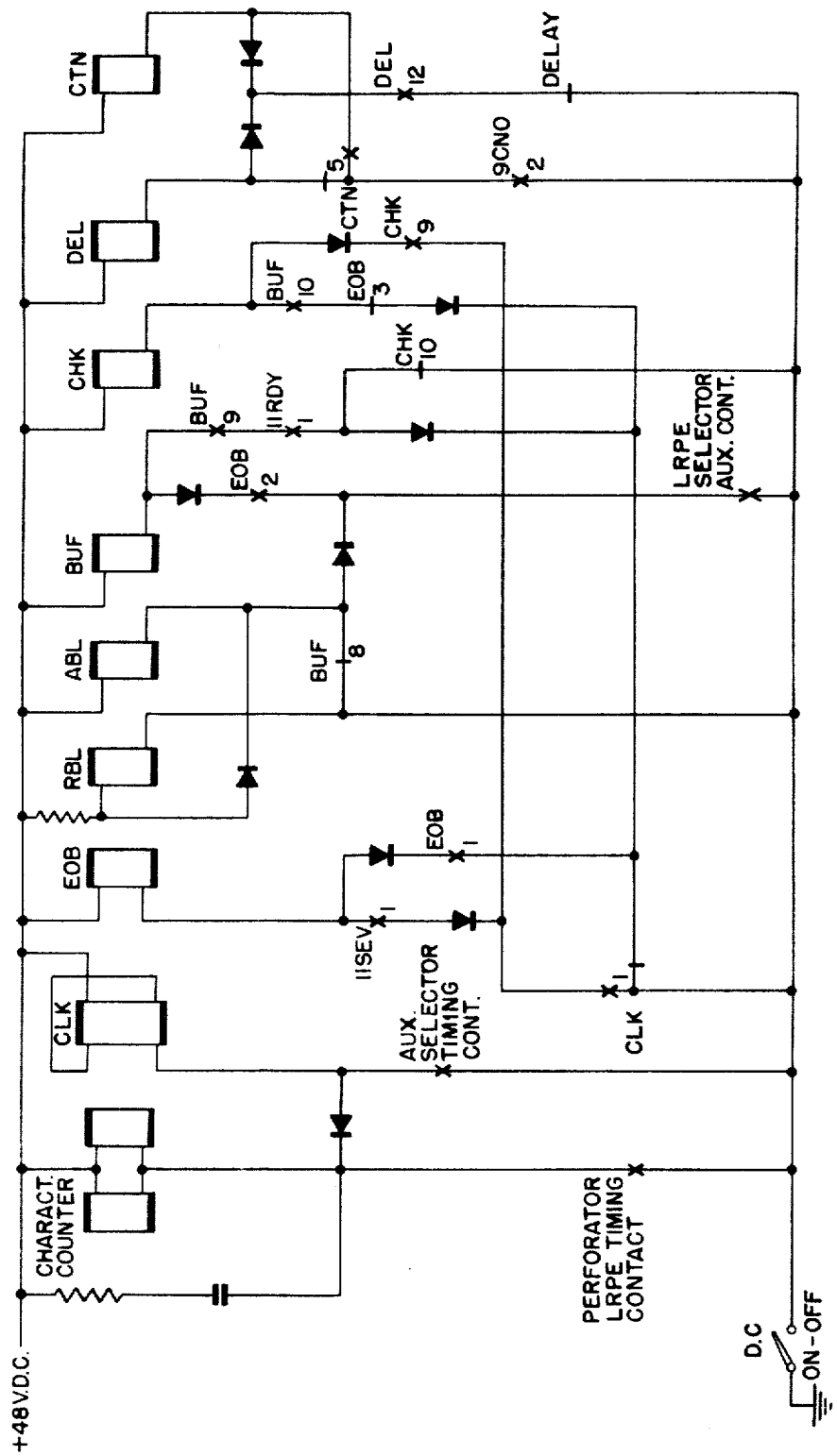
Figure 11:
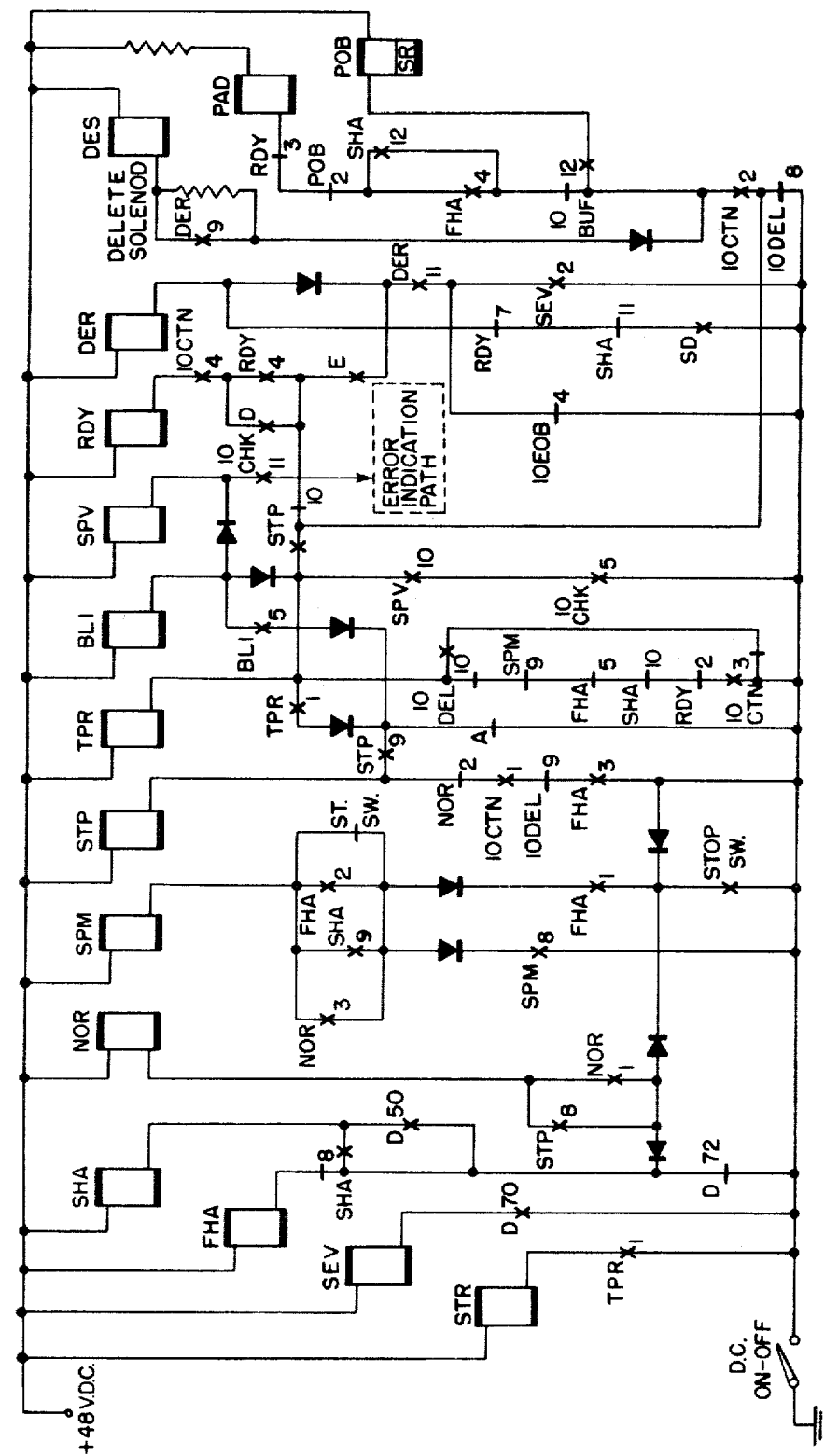

At the receiving station, power initially is turned on manually by closure of the power on/off switch in FIG. 9 and by closure of the DC power switches in FIGS. 10 and 11. The relay 10–ABL then is operated over a path extending from ground through the now closed break contact 10–BUF–8 and the coil of the relay 10–ABL to a source of positive potential. Operation of the relay 10–ABL has no effect on the circuit at this time, but its function will be described subsequently. When the receiving digital subset is connected to the sending digital subset in a conventional manner, the relays 9–CNO and 9–NST are operated causing the motors for the message punch LRPE and delete punch LRSB to be energized through the now closed make contact 9–NST–4. A steady mark signal is supplied to the output of the receiving station through its digital subset, through the now closed break contact 9–11–STP–11 and the now closed start contact (FIG. 9), and this mark signal is sent to the digital subset at the sending station where it is detected by the relay 5–LNR.

At the same time, operation of the relay 9–CNO causes a delay relay 10–DEL to be operated over a path extending from ground through the now closed make contact 10–9–CNO–2, the now closed break contact 10–CTN–5 and the coil of the relay 10–DEL to a source of positive potential. Operation of the relay 10–DEL closes the make contact 9–10–DEL–11 thereby assuring a steady marking signal at the output of the receiving station so long as the relay 10–DEL is operated. The relay 10–DEL locks operated through its own now closed make contact 10–DEL–12 and the now closed break delay contact on the sending timer of the receiving station. (The contact is shown in FIG. 10 and its operating sequence is shown in FIG. 12.

Operation of the relay 10–DEL completes an operating path for the timing relay 11–TPR extending from ground through the now closed break contact 11–10–CTN–3, the now closed make contact 11–10–DEL–10, and the coil of the relay 11–TPR to a source of positive potential. The relay 11–TPR holds itself operated through its own make contact 11–TPR–1 and the now closed A contact on the timing disk of the sending timer (refer to FIG. 12 for the timing cycle of the A cam). Upon operation of the relay 11–TPR, the make contact 11–TPR–1 is closed completing an operating path for the timing motor relay 11–STR which extends from ground through the now closed make contact 11–TPR–1 and the winding of the relay 11–STR to a source of positive potential. Operation of the relay 11–STR, in turn closes the make contact 9–11–STR–4 thereby energizing the timer motor (FIG. 9) of the receiving station sending timer generator. This causes the timer, which is of the type shown in FIGS. 3 and 4, to initiate its first cycle of operation.

In the meantime, the relay 10–CTN is operated through the path extending from ground, the now closed delay contact on the timer (FIG. 10) and the now closed make contact 10–DEL–12. Operation of the relay 10–CTN opens the break contact 11–10–CTN–3 causing the original operating path for the relay 11–TPR to be broken. It should be noted that operation of the sending timer generator at this time does not cause any signal to be applied to the output of the digital subset of the receiver (FIG. 9) since the make contact 9–10–DEL–11 remains closed placing a constant mark signal at the output of the receiving station irrespective of the operation of the start or stop contacts of the sending timing generator.

Approximately half way through the timer cycle of the sending timer, the A contact is opened thereby releasing the relay 11–TPR which in turn causes the release of the relay 11–STR. However, the contact 9–11–STR–4 is not opened at this time since the armature of the relay 11–STR is held in its operated position by the timing disk of the receiving station sending timer and remains in its operated condition until the end of a stepping cycle of operation of the signal timer as previously described in conjunction with FIGS. 3 and 4. At that time, the contact 9–11–STR–4 opens and the timer motor is de-energized.

At the end of the timing cycle of the timer generator, the delay cam (FIG. 10) is momentarily opened causing the delay relay 10–DEL to be released. The relay 10–CTN is held operated over a locking path extending from ground through the now closed make contact 10–9–CNO–2 and its own now closed make contact 10–CTN–5. Release of the relay 10–DEL provides an operating path for the pad out relay 11–PAD which extends from ground through the now closed break contact 11–10–DEL–8, the now closed make contact 11–10–CTN–2, the now closed break contact 11–10–BUF–10, one or the other of the break contacts 11–FHA–4 or 11–SHA–12 (relay 11–FHA is operated if the counter is between and including 1 and 49 on start up, and relay 11–SHA is operated if the counter is between and including 50 and 71 on start up) the now closed break contacts 11–POB–2 and 11–RDY–3, and the coil of the relay 11–PAD to a source of positive potential.

Operation of the relay 11–PAD opens the normally closed break contact 9–11–PAD–2 which opens the circuit to the message punch magnet (LRPE MAG, FIG. 9). This causes the message punch to feed out tape as long as this condition prevails. The operation of the message punch in feeding out tape causes the character counter to be stepped once for each character fed out by momentary closure of the LRPE timing contact (FIG. 10) once during each character. As a consequence, the character counter is cleared; and when the 70th count is reached, the contact 11–D–70 is closed momentarily. This causes the relay 11–SEV to be operated over an obvious path.

Operation of the relay 11–SEV closes the make contact 10–11–SEV–1 preparing the operating path for an end-of-block relay 10–EOB which is operated upon the next operation of the clock relay 10–CLK which also is pulsed once for each character by the operation of the LRPE timing contact (FIG. 10). When the clock relay 10–CLK operates on the 71st count, the make contact 10–CLK–1 is closed; and the relay 10–EOB operates and locks operated upon release of the relay 10–CLK at the end of the 71st count over a path extending from ground, the now closed break contact 10–CLK–1, the now closed make contact 10–EOB–1 and the winding of the relay 10–EOB to a source of positive potential. Approximately 20 milli-seconds later the LRPE selector auxiliary contact (FIG. 10) closes completing an operating path for the buffer relay 10–BUF extending from ground through the now closed auxiliary contact, the now closed make contact 10–EOB–2 and the winding of the relay 10–BUF to a source of positive potential. The pad out relay 11–PAD then is released by the opening of the break contact 11–10–BUF–12 and it is held released during the remainder of the end-of-block sequence due to the operation of the slow release pad out blind relay 11–POB which is operated over a path extending from ground through the now closed break contact 11–10–DEL–8, the now closed make contacts 11–10–CTN–2 and 11–10–BUF–12, and the coil of the relay 11–POB to a source of positive potential.

Although the relay 11–PAD has been released, the message punch completes one more character due to its mechanical characteristics. As a consequence, the LRPE timing contact is closed momentarily one more time causing the character counter to step to the 72nd count and causing one more operation of the relay 10–CLK. This causes the relay 10–EOB to be released by the opening of the break contact 10–CLK–1. It should be noted that the LRPE selector auxiliary contact is closed only momentarily; therefore, when the auxiliary contact opens the relay 10–BUF releases. (It should also be noted that the 10–11–RD Y–1 contact has not operated yet.) Since the relay 10–BUF is not operated when the relay 10–EOB is released, the check relay 10–CHK is not operated at this time.

The end-of-block sequence just described also may be used to reset the parity register to zero in any suitable manner such as described in the afore-mentioned copending Silberg-Slayton application, so that both the character and the parity register now are set to zero prior to receipt of information from the sending station.

The relay 11–TPR then is operated over a path which extends from ground through the now closed make contact 11–10–CTN–3, the now closed break contacts 11–RDY–2, 11–SHA–10, 11–FHA–5, 11–SPM–9 and 11–10–DEL–10, and the coil of the relay 11–TPR to a source of positive potential. This once again initiates a cycle of operation in the signal timer generator in the manner previously described. However, this time since the relay 10–DEL is released, the make contact 9–10–DEL–11 is opened; and a start signal is sent by the receiving station sending timer to the sending station by means of the operation of the start contact (FIG. 9) functioning through the now closed break contact 9–11–STP–11 (see FIG. 12 for the signal sequence generated by the start contact).

Shortly after operation of the signal timer generator, the B and C contacts (FIG. 9) of the signal timer are closed, thereby blinding the auxiliary selector magnet driver and the message punch selector magnet driver (LRPE) from responding to any input signals supplied to the sending station from the digital subset. It should be noted at this time that the closure of any contact across the S and Y inputs to either selector magnet driver causes these selector magnet drivers to be held in a constant marking condition irrespective of the input signals applied to the signal input terminals. Both of these selector magnet drivers are identical and preferably are of the type disclosed in the copending patent application No. 121,923, filed July 5, 1961 in the name of C. R. Winston. This selector magnet driver further is disclosed in Teletype Corporation's specification 50042S, copyright 1961 by the Teletype Corporation; and the input terminals W, G, S, Y, etc., shown in FIG. 9 are identical to the input terminal designations shown in the Teletype Corporation specification. Other suitable selector magnet drivers could be used so long as they are capable of being blinded by external controls of the type disclosed herein.

A short time later (refer to FIG. 12), the D and E contacts of the signal timer are closed completing an operating path for the ready relay 11–RDY extending from ground through the now closed break contacts 11–10–DEL–8 and 11–STP–10, the D contact of the signal timer, the now closed make contact 11–10–CTN–4, and the winding of the relay 11–RDY to a source of positive potential. At the same time, the delete relay 11–DER is operated over a path likewise extending from ground through the now closed break contacts 11–10–DEL–8 and 11–STP–10, through the now closed E contact, and the coil of the relay DER to a source of positive potential. It should be noted at this time that the relay 11–DER holds itself operated through its own make contact 11–DER–11 and the contact 11–10–EOB–4 until an end-of-block signal is received and that the relay 11–RDY locks operated through its own make contact 11–RDY–4 and the contact 11–STP–10.

When the delete relay operates, it closes its make contact 11–DER–9 which completes an operating path for a delete solenoid extending from ground through the now closed break contact 11–10–DEL–8, the now closed make contact 11–10–CTN–2, the contact 11–DER–9, and the coil of the delete solenoid to a source of positive potential. The delete solenoid allows operation of the delete punch which perforates delete characters in the message tape passing through it until the delete solenoid is released, at which time the delete punch is rendered inoperative. Since the delete relay 11–DER is not released until an end-of-block signal is received, as will be explained hereinafter, the delete solenoid causes the delete punch to perforate delete characters in the tape during receipt of the entire first block of information. Tape equal in length to one block stretches between the message punch and the delete punch, and this initial length of tape forms no part of the desired message which is being received at the receiving station.

Following this sequence the D and E contacts of the signal timer once again open but have no effect upon the operation of the circuit since the relays 11–RDY and 11–DER are held operated through their own contacts, as explained previously. Following the opening of the D and E contacts of the signal timer, the A contact is momentarily opened causing release of the relay 11–TPR and therefore release of the relay 11–STR in the manner previously described. At the end of the timing cycle the timer motor is disabled, as described in conjunction with FIGS. 3 and 4; and the B and C cams open thereby removing the blinding signal from the LRPE selector magnet driver (FIG. 9). The auxiliary selector magnet driver, AUX–SMD, is held blinded to incoming signals due to the operation of the relay 10–ABL through a path extending from ground through the now closed break contact 10–BUF–8 and the coil of the relay to a source of positive potential. This causes contact 9–10–ABL–2 to be closed, blinding the auxiliary selector magnet driver during normal reception of a message from the sending station.

The sending station now is ready to receive information signals from the transmitter. The timing contact on the LRPE message perforator is closed momentarily during receipt of each incoming character and causes operation of the clock relay 10–CLK and the character counter stepping switch relay once for each character. The character counter at the receiver is identical in all respects to the character counter at the sending station and consists of a 72 character stepping switch. After the first character is received, the character counter steps to its first contact; and the contact 11–D–72 is closed completing a path extending from ground through the contact 11–D–72, the now closed break contact 11–SHA–8 and the coil of the first half relay 11–FHA to a source of positive potential to operate the relay 11–FHA. The control circuits remain in this mode of operation until the 50th character is received at which time the contact 11–D–50 is closed by the character counter completing an obvious energization path for the second half relay 11–SHA, operation of which opens the break contact 11–SHA–8 thereupon releasing the relay 11–FHA. The relay 11–SHA locks operated through its own now closed make contact 11–SHA–8.

When the 70th character is counted by the character counter, the contact 11–D–70 is closed providing a ground path to the 70th relay 11–SEV causing it to operate as described previously. Then when the clock make contact 10–CLK–1 closes on the 71st character the end-of-block relay 10–EOB is operated over a path extending from ground through the now closed make contact 10–CLK–1, the now closed make contact 10–11–SEV–1 and the coil of the relay 10–EOB to a source of positive potential. Approximately 20 milliseconds later the LRPE selector auxiliary contact (FIG. 10) closes completing a path extending from ground through the auxiliary contact, the now closed make contact 10–EOB–2 and the coil of the buffer relay 10–BUF to a source of positive potential to operate the relay 10–BUF. The relay 10–BUF than locks through its own make contact 10–BUF–9, the now closed make contact 10–11–RDY–1 and the now closed break contact 10–CHK–10. When the clock relay 10–CLK releases at the end of the 71st character the make contact 10-CLK-1 opens and the break contact 10-CLK-1 closes causing the end-of-block relay 10-EOB to lock operated through its own make contact 10-EOB-1 and the break contact 10-CLK-1. At this point, both the relay 10-EOB and the relay 10-BUF are operated. When the 72nd character is reached, the clock relay 10-CLK once again is operated thereby causing the relay 10-EOB to be released since the relay 11-SEV previously was released by the opening of the contact D-70 on the 71st character which caused the make contact 10-11-SEV-1 to be opened; and the other path for energizing the relay 10-EOB is opened by the opening of the break contact 10-CLK-1.

When the clock relay is released by the opening of the auxiliary selector timing contact at the end of the 72nd character, the check relay 10-CHK is energized over a path extending from ground through the now closed break contact 10-CLK-1, the now closed break contact 10-EOB-3, the now closed make contact 10-BUF-10, and the coil of the relay 10-CHK to a source of positive potential. The energizing path for the relay 10-BUF now is shifted to be controlled by the clock relay through contact 10-CLK-1, since the break contact 10-CHK-10 in the lock path is now open. Receipt of the check character operates the clock relay once more to open the break contact 10-CLK-1 causing a release of the relay 10-BUF since the end-of-block relay 10-EOB previously has been released. The check relay 10-CHK is held operated through a locking path extending from ground through the now closed make contact 10-CLK-1 and its own make contact 10-CHK-9 until the opening of the clock relay make contact 10-CLK-1 at the end of the check character which causes the relay 10-CHK to be released.

While the above-mentioned sequence of operation is taking place for the end-of-block, buffer and check relays, the receiving circuit is being prepared for receipt of the check character from the snding station which is to be compared with a locally created parity check character. During receipt of the information characters when the buffer relay 10-BUF is released, the blinding relay 10-RBL is released; because a shunt path is provided around its coil extending through a diode and the normally closed break contact 10-BUF-8. As stated previously, during the period when the relay 10-BUF is not operated the blinding relay 10-ABL is operated over a path described previously.

When the buffer relay 10-BUF is operated as described above, the break contact 10-BUF-8 is opened; but the shunt for the relay 10-RBL and the operating path for the relay 10-ABL remain until the LRPE auxiliary contact opens. When this occurs, the shunt for the blinding relay 10-RBL is removed and the relay 10-RBL is operated. At the same time, the relay 10-ABL is released. Operation of the relay 10-RBL closes the make contact 9-10-RBL-12 thereby blinding the message punch selector magnet driver (LRPE-SMD, FIG. 9) to the receipt of the parity check character following the 72nd character of the block. At the same time, the release of the blinding relay 10-ABL causes the make contact 9-10-ABL-2 to be opened rendering the auxiliary selector magnet driver (AUX-SMD, FIG. 9) responsive to the receipt of the incoming check character. Operation of the check relay 10-CHK causes a comparison of the parity check character received by the auxiliary selector to be made with the parity check character created in the parity register circuit of the receiving station in a manner disclosed in the aforementioned copending Silberg-Slayton application. The manner in which this comparison is made forms no part of this invention and will not be described herein.

When the buffer relay 10-BUF is released, as described previously, the contact 10-BUF-8 once again is closed and the relay 10-ABL is operated and the relay 10-RBL is released at the end of the check character. The receiving station then is prepared for receipt of the next block of information from the sending station with the message punch selector magnet driver (LRPE-SMD) responsive to incoming signals and the auxiliary selector magnet driver (AUX-SMD) blinded to incoming signals. As stated previously, operation of the relay 10-EOB at the end of the first block causes the delete relay 11-DER to be released by opening the break contact 11-10-EOB-4. During normal operation the delete relay 11-DER never again is operated until the timing contact for a start signal following receipt of an errored or interrupted block once again is operated.

*Operation of receiver upon receipt of an error in previous block*

If an error has occurred in the block of information for which the comparison of the local and received check characters is made, an error indication signal is obtained from the parity comparison circuit which is applied over the error indication path (indicated in FIG. 11) through the now closed make contact 11-10-CHK-11 to operate the relay 11-SPV to indicate the error. The manner in which a signal is obtained over the error indication path may be accomplished by any suitable means, preferably in the manner disclosed in the afore-mentioned copending Silberg-Slayton application. Operation of the error indication relay 11-SPV causes the blinding relay 11-BLI to be operated over a path extending from ground through the now closed make contacts 11-10-CHK-5 and 11-SPV-10 and the coil of relay 11-BLI to a source of positive potential. This causes the LRPE selector magnet driver (FIG. 9) to be blinded to further incoming signals by the closure of the make contact 9-11-BLI-32. Thus, even though incoming signals of the next succeeding block still are being received from the transmitter, the message punch does not record these signals since it is blinded to them. The relay 11-BLI locks in its operated condition through the make contact 11-BLI-5 and the A contact of the signal timer generator of the receiver.

At the time that the relay 11-BLI is operated, the timing relay 11-TPR is operated over the same path and locks operated through its own make contact 11-TPR-1 and the A contact of the signal timer generator. Following this operation, the relay 10-CHK is released in the manner previously described, and this in turn causes the relay 11-SPV also to be released by the opening of the make contact 11-10-CHK-11.

Operation of the relay 11-TPR causes operation of the relay 11-STR and the timer motor in the manner previously described. The start contact of the signal timer generator then causes the start signal shown in FIG. 12 to be sent to the sending station. At the time that the E contact on the timing disc on the signal timer generator closes, the delete relay 11-DER is energized over a path previously described and it locks through its own make contact 11-DER-11 and the end-of-block contact 11-10-EOB-4 so that it remains in its energized condition until the next end-of-block signal is received. As stated previously, operation of the delete relay 11-DER causes the delete solenoid 11-DES to be energized which in turn causes the delete punch to operate so long as the delete solenoid 11-DES remains in its operated condition.

When the A contact of the signal timer generator is opened at approximately the midpoint of the timing cycle, the relays 11-TPR and 11-BLI are released; and at the end of the timing cycle the timer motor is released through the now open make contact 9-11-STR-4 in the manner described previously. The receiver now is ready for a re-run of the errored block by the sending station. It is to be noted that at this time the errored block of information is in storage between the message punch and the delete punch; and that during retransmission of the errored block, this stored errored block is deleted by the operation of the delete punch which continues to perforate delete characters in the tape until the next end-of-block signal occurs. Since the length of errored tape is equal to one block, this results in complete cancellation of the errored block simultaneously while the receiving station is rerecording that block in the message punch.

*Operation of sending station upon receipt of a re-run signal from the receiving station*

At the time that the relay 11–SPV is operated at the receiving station initiating the transmission of a re-run or a start signal to the sending station, the sending station already has begun transmission of the next succeeding block of information. However, the errored block is in storage between the reading feed wheel of the tape transmitter and the run-out feed wheel as previously described. When the first long space of the re-run or start signal sent by the receiving station is received, the line relay 5–LNR is released causing the make contact 7–5–LNR–1 to be opened which in turn effects the release of the detect relay 7–DET after a predetermined time interval established by the slow release characteristic of that relay. The first long spacing signal sent by the signal timer generator of the receiving station is chosen to be longer than the release time of the relay 7–DET. When the detect relay 7–DET is released, it causes the relay 7–GO to be released by opening the make contact 7–DET–8 and the relay 7–RUN to be released by opening the make contact 7–DET–6. Release of the relay 7–RUN causes the output line from the sending station to be shunted by closing the break contact 5–7–RUN–10 and further causes the reader magnet to be deenergized by opening its operate path by opening the make contact 7–RUN–1. As a consequence, no further transmission takes place from the sending station.

When the first marking signal of the start signal sequence from the receiving station is received, the line relay 5–LNR once again is operated closing the make contact 7–5–LNR–1. From this point on, the operation of the sending station is identical to the operation previously described for the receipt of the initial valid start signal. It should be noted, however, that the amount of tape stored between the reading feed wheel and the run-out feed wheel of the transmitter contains the entire errored block of information plus a few characters of the next succeeding block. When the pull-back solenoid is energized, the tape between these feed wheels is pulled back to a tight-tape condition; and the first character of the errored block then is in position over the reading pins ready for re-transmission. It does not make any difference how many characters were transmitted of the block following the errored block since the pull back is not metered, but is a pull back to a tight-tape condition causing the first character of the errored block always to be the first character transmitted upon resumption of transmission.

*Manual stop initiated by receiving station*

In accordance with this invention provision has been made for the operator at the receiving station to stop transmission at any time in such a manner that block synchronization between the sending station and the receiving station is maintained when transmission is resumed.

If, for some reason, the receiving station operator desires to stop transmission, he must push the manual stop button shown as the stop switch in FIG. 11. Initiation of a stop sequence can occur only when the first half relay 11–FHA at the receiving station is energized, that is, during the first fifty characters of a block. If the stop switch is closed at the time the relay 11–FHA is operated, a path is completed from ground through the stop switch through the now closed make contacts 11–FHA–1 and 11–FHA–2 and the coil of the stop memory relay 11–SPM to a source of positive potential to operate that relay. At the same time, closure of the stop switch completes a path extending from ground through the stop switch, the now closed make contact 11–FHA–3, the now closed break contact 11–10–DEL–9, the now closed make contact 11–10–CTN–1, the now closed break contact 11–NOR–2, and the windings of the stop relay 11–STP to a source of positive potential to operate the relay 11–STP. This operation causes the ready relay 11–RDY to be released by opening the break contact 11–STP–10. The relay 11–STP locks operated through its own make contact 11–STP–9 and the A contact on the signal timer generator.

The timer relay 11–TPR is operated by the operation of the relay 11–STP over a path extending from ground through the now closed break contact 11–10–DEL–8, the now closed make contact 11–STP–10 and the winding of the relay 11–TPR to a source of positive potential. It also should be noted that the relay 11–NOR is operated by the operation of the stop relay 11–STP over a path extending from ground through the now closed break contact 11–D–72, the now closed make contact 11–STP–8, and the winding of the relay 11–NOR to a source of positive potential. The relay 11–NOR locks operated through its own make contact 11–NOR–1 and the break contact 11–D–72. At this time the original operating path for the stop relay 11–STP is broken by the opening of the break contact 11–NOR–2. However, it is to be noted that the stop relay 11–STP remains operated over the holding path mentioned previously.

At the time that the ready relay 11–RDY was released, a path for energizing the pad-out relay 11–PAD was completed from ground through the now closed break contact 11–10–DEL–8, the now closed make contact 11–10–CTN–2, the now closed break contact 11–10–BUF–12, the now closed make contact 11–FHA–4, the now closed break contacts 11–POB–2 and 11–RDY–3, and the winding of the relay 11–PAD to a source of positive potential. Operation of the pad-out relay 11–PAD causes the break contact 9–11–PAD–2 to be opened thereby causing the LRPE selector magnet driver to continue to drive the message punch causing it to feed out blank tape. During this period the character counter is operating in its normal manner and continues to count each character fed out of the message punch. It should be noted that the feed-out relay 11–PAD remains energized throughout the entire block through either of two parallel paths provided by the make contact 11–FHA–4 or 11–SHA–12, one or the other of which is closed until the end of the block or the 72nd count by the character counter is reached.

Simultaneously, while this pad-out of blank tape is occurring at the receiver, the operation of the timer relay 11–TPR has caused the timer motor of the sending timer generator to be energized in a manner previously described. Since the stop relay 11–STP is energized, the start contacts of the sending timer are prevented from applying a start signal to the output of the receiving station shown in FIG. 9 by the now open break contact 9–11–STP–11. A stop signal, however, is supplied to the output of the receiving station over a path extending through the now closed make contact 9–11–STP–11. As a consequence, the signal supplied to the sending station by the sending timer generator at the receiving station is the "stop contact" signal shown in FIG. 12. At the time the "A" contact is opened (see in FIG. 12), the stop relay 11–STP is released and the output signal applied to the output terminal shown in FIG. 9 once again is taken from the start contact of the sending timer generator; but as is clearly seen in FIG. 12, the stop and start signals at this time are both continuously marking for the duration of the timing cycle.

In the meantime, when the character counter at the receiving station reaches its 70th position, the contact D–70 is momentarily closed thereby energizing momentarily the relay 11–SEV. When the next operation of the clock relay 10–CLK occurs, the end-of-block relay 10–EOB is operated over a path previously described. Operation of the end-of-block relay 10–EOB then causes the relay 10–BUF to be operated over a path previously described. This causes the pad-out relay 11–PAD to be released by the opening of the break contact 11–10–BUF–12. At the same time the pad-out blinding relay 11–POB is operated through the now closed make contact 11–10–BUF–12. The relay 11–POB is a slow release relay which holds itself operated for a predetermined period. This period of time is chosen to be sufficient to cause the pad-out blind relay 11–POB to remain operated through the entire end-of-block sequence causing the contact 11–POB–2 to remain open preventing operation of the relay 11–PAD when the relay 10–BUF releases.

When the character counter reaches the 72nd count, the contact 11–D–72 is opened releasing the relay 11–SHA and at the same time the relay 10–EOB is released by the end-of-block signal sequence previously described. The release of the end-of-block relay 10–EOB opens the make contact 10–EOB–2 thereby releasing the buffer relay 10–BUF due to the fact that the make contact 10–11–RDY now is open. Thus, the relay 10–BUF is never operated when the relay 10–EOB is released in this manual stop sequence. As a consequence, the check relay 10–CHK is not operated and no comparison between the parity count stored in the local parity register with any incoming parity signal is made. The operation of the end-of-block sequence also may be used to reset the parity register to zero as stated previously in the discussion of the start sequence. Such resetting of the parity register forms no part of the block synchronization circuit of this invention, but the parity register must be reset prior to the initiation of the next start sequence which precedes the receipt of additional information from the sending station. At the time that the contact D–72 opens, the relay 11–NOR is released.

It should be noted that at the time the pad-out relay 11–PAD released, as described above, the break contact 9–11–PAD–2 is closed preventing further feed out or pad out of tape from the message punch 31.

The receiver remains in this condition until the operator manually pushes the start switch shown as a break contact ST. SW. in FIG. 11. This causes the stop memory relay 11–SPM to be released which in turn allows a path to be completed for operating the timer relay 11–TPR over a previously described path by closing the break contact 11–SPM–9. At this time the normal start sequence of the receiver, as previously described, is initiated; and a start or re-run signal is generated by the start contact and is supplied to the sending station. The operation of the receiver is the same during this sequence as it is during the initial start-up sequence.

*Stop sequence at the sending station*

When the long spacing stop signal generated by the stop contact at the receiving station signal timer generator is received at the input to the sending station (FIG. 5), the line relay 5–LNR is released opening the make contact 7–5–LNR–1. Since the stop signal sent by the receiver has a longer duration than release time of the relay 7–DET, the relay 7–DET is released causing the relays 7–GO and 7–RUN to be released in a manner previously described; and the release of the relay 7–RUN causes further operation of the reader magnet to cease and shunts the output line of the sending station as previously described. When the line relay 5–LNR receives the marking signal from the receiver following the long space pulse, the timing relay 7–TMR is energized through the now closed make contact 7–5–LNR–1 and the now closed break contacts 7–DET–2 and 7–GO–1. This starts the local signal timer in the sending station in operation in a manner previously described; and when the I contact (FIG. 7) closes, the relay 7–DET is re-energized and held energized through its own make contact 7–DET–4 and the now closed make contact 7–5–LNR–1. The operation of the relay 7–DET has no further effect at this time.

The F and G contacts of the sending station signal timer sample the incoming signal; and since it is a steady marking signal with the make contact 7–5–LNR–1 closed and the break contact 7–5–LNR–1 open, the first closure of the G contact causes the relay 7–NOG to be operated. This in turn causes the stop relay 8–STP to be operated over a path extending from ground through the normally closed break contact 8–C–72, the now closed make contacts 8–5–CNT–10 and 8–7–NOG–2, and the winding of the relay 8–STP to a source of positive potential. The relay 8–STP locks operated through its own make contact 8–STP–11 and the now closed break contact 8–7–RUN–4. When the J contact of the signal timer opens, the relay 7–NOG is released and the system remains in this state until a start signal is received.

*Sending station re-run after a stop signal in the first third of a block*

If the stop signal described in the preceding section is received prior to the 30th character of the block under transmission, the relay 8–FTH is operated. When a start signal subsequently is received from the receiving station, the sequence of operation previously described for the initial receipt of a valid start signal is repeated. At the time, however, that the relay 7–GO is operated, a circuit is completed for operating the sending station run-out relay 7–PDA over a path extending from ground through the now closed make contacts 7–8–STP–2, 7–8–FTH–12 and 7–GO–6, the now closed break contact 7–RUN–5, and the winding of the relay 7–PDA to a source of positive potential. The operation of the run-out relay 7–PDA closes the make contact 7–PDA–12 thereby causing the reader magnet to be energized which in turn causes the distributor magnet to operate. No signals, however, are transmitted from the sending station due to the fact that the distributor output (FIG. 5) is shunted by the now closed break contact 5–7–RUN–10. The relay 7–RUN is prevented from operating due to the fact that the break contact 7–PDA–10 is opened by the operation of the relay 7–PDA and the relay 7–PLB is prevented from operating by opening the break contact 7–PDA–11.

Since the reader and distributor are operating, the character counter is pulsed as if normal transmission were taking place. As a consequence, when the 30th count is reached the contact 8–C–30 is closed causing the run-out solenoid 8–ROS to be energized over a previously described path. At the same time, the relay 8–STH is operated causing the relay 8–FTH to be released. The run-out relay 7–PDA is held operated through the now closed make contact 7–8–STH–12. The operation of the run-out solenoid by the closure of the contact 8–C–30 causes one-half block of information to be released from storage by the run-out wheel in the manner described previously. The character counter continues to operate; and when the 48th character is reached, the contact 8–C–48 is closed momentarily causing a second operation of the run-out solenoid 8–ROS. This causes the last half of the block of information in storage to be released from storage. At the same time, the last third relay 8–LTH, is operated causing the release of the second third relay 8–STH which in turn opens the make contact 7–8–STH–12 releasing the run-out relay 7–PDA. At this point the reader magnet is released by the opening of the make contact 7–PDA–12.

When the relay 7–PDA is released, an obvious path is completed for operating the reset relay 8–RES which closes the make contact 8–RES–2 and opens the break contact 8–RES–9. The character counter magnets then are rapidly stepped through their own interrupter contact (FIG. 8) until the 72nd count is reached causing the break contact 8–C–72 to open thereby stopping operation of the character counter magnets. The relays 8–RES, 8–LTH, and 8–STP are released and the parity character generator is reset to zero.

At this point, the pull-back relay 7–PLB is energized over a previously described path; and the operation of the circuit resulting in a pull back of all the tape now in storage to a tight-tape condition is the same as that described following the receipt of the initial start signal from the receiving circuit. It is to be noted that only the interrupted block of information has been pulled back and now is ready to be repeated. The previously fully transmitted block which was in storage was completely removed from storage by the two operations of the run-out solenoid 8–ROS which occurred prior to the pull back of the tape at the reader. As stated previously in the description of the initial start sequence, no run-out of stored tape will occur upon retransmission of the first block following the pull back of the tape due to the operation of the relay 7–POD. However, for every subsequent error-free block transmitted by the sending station, run-out of a stored block at the 30th and 48th characters will occur until the next time that a pull back of the tape is necessitated due to an error, a stop signal, or line disconnect.

*Sending station re-run after a stop received during the second third of a block*

If the stop signal is received by the sending station in the second third of a block, that is, between the 30th and 48th characters, the second third relay 8–STH is operated. The stop signal causes the line relay 5–LNR to release which in turn causes the sequence described in the preceding section following the receipt of the stop signal to be repeated. The run-out relay 7–PDA is energized when the relay 7–GO closes over a path extending from ground through the now closed make contact 7–8–STH–12, the now closed make contact 7–GO–6 and the now closed break contact 7–RUN–5 and the coil of the relay 7–PDA to a source of positive potential. As described in the preceding section, operation of this relay prevents operation of the run and pull back relays 7–RUN and 7–PLB until the relay 7–PDA is released at the end of the second third of the block by the opening of the contact 7–8–STH–12.

Since the stop signal is received after the 30th character was transmitted, the run-out solenoid 8–ROS already has been operated once by the closure of the contact 8–C–30. Now while the output of the transmitter is blinded due to the fact that the break contact 5–7–RUN–10 is shunting the distributor output, the second operation of the run-out solenoid occurs when the contact 8–C–48 is closed. From this point on the system functions in the same manner as it did when the stop signal was received in the first third of a block.

*Sending station re-run after a stop received during the last third of a block*

When the stop signal is received in the last third of a block; that is, after the 48th character has been transmitted, the previously transmitted block has been completely run out of storage due to the operation of the run-out solenoid 8–ROS at the 30th and 48th characters. When the stop signal is received, the operation of the sending station circuit is the same as previously described for the stop signals received in the first and second thirds of a block. However, when the relay 7–GO is operated, the run-out relay 7–PDA is not operated due to the fact that both 8–FTH and 8–STH are released during the last third of the block causing the make contacts 7–8–FTH–12 and 7–8–STH–12 to be opened. Consequently, the operation of the relay 7–GO immediately causes the reset relay 8–RES to be energized over an obvious path, and the sequence described in the previous two sections following the operation of the reset relay 8–RES is repeated, and normal transmission resumes.

*Sending station sequence following line disconnect*

Whenever either the outgoing channel from the sending station or the incoming channel to the sending station between the data subsets 22 and 23 goes spacing for a period of over one second, a line disconnect is considered to have occurred and the digital subsets 22 and 23 at both stations disconnect. At the sending station when this occurs, the relays 5–MST and 5–CNT are released. This in turn causes the release of the relay 7–GO by the opening of the make contact 7–5–CNT–11; and at the same time, the motor for the transmitter distributor is deenergized by the opening of the contact 6–5–MST–1. Release of the relay 7–GO opens the make contact 7–GO–7 which releases the run relay 7–RUN. This in turn causes the reader magnet and consequently the distributor magnet to be deenergized. The disconnect from the receiving station causes the line relay 5–LNR to be released. All other relays remain in whatever operated or released condition they were in at the time that the line disconnect occurred. The sending station remains in this condition until reconnection is made by means of the digital subsets, and a start signal is transmitted to the sending station from the receiving station.

*Receiving station sequence following line disconnect*

When a line disconnect occurs, the relays 9–CNO and 9–NST at the receiver are released. This in turn causes the release of the connect relay 10–CTN by the opening of the make contact 10–9–CNO–2. At the same time, the drive motors for the message punch and delete punch are deenergized by the opening of the make contact 9–NST–4. Release of the relay 10–CTN opens the make contact 11–10–CTN–4 causing the relay 11–RDY to be released, which in turn blinds the LRPE and AUX selector magnet drivers (FIG. 9) to incoming signals by putting the selectors in a steady marking condition through the closing of the break contacts 9–11–RDY–10 and 9–11–RDY–9. All other relays at the receiving station remain in the state of operation which occurred just prior to the line disconnect, and the receiver remains in this condition until a circuit reconnect is made through the digital subsets 22 and 23.

*Operation of the receiver upon reconnect following a line disconnect*

When line connections are re-established at the receiver, the connect relays 9–CNO and 9–NST are operated. Operation of the relay 9–NST closes the make contact 9–NST–4 to energize the LRPE and LRS motors for the message punch and delete punch, respectively. Closure of the make contact 10–9–CNO–2 energizes the delay relay 10–DEL in the same manner in which this relay is energized upon initial operation of a start-up sequence. The circuit functions in the same manner as previously described following an initial start-up sequence. The pad-out relay 11–PAD is operated as it is following a normal start-up sequence and causes the remainder of the interrupted block to be fed out of the message punch. After the interrupted block has been fed out of storage, the timer relay 11–TPR is energized a second time and a normal start sequence from the receiver is initiated. While the message punch receives re-transmission of the interrupted block, the delete punch simultaneously deletes the interrupted block from the tape. In all cases this operation is identical to the normal start sequence previously described for the initial start-up of the receiver. It should be noted that the remainder of the interrupted block, however long it may be, is fed out or padded out of the message punch following a disconnect and prior to the receipt of the re-transmitted block. This interrupted block, which is stored between the two punches, will be deleted as described above.

*Operation of the sending station upon re-connection following a line disconnect*

Immediately following re-establishment of a connection following a line disconnect, the connect relays 5–MST and 5–CNT and the line relay 5–LNR are energized. The detect relay 7–DET remains operated, and the system then remains in this state until a valid start signal is received from the receiving station. It should be noted that various other relays which remained operated following the disconnect at the sending station continue to remain operated throughout this re-connect sequence.

The operation at the sending station with respect to run-out of the stored information and pulling back of the tape following line disconnect occurring in the first, second or last thirds of the block is identical in all respects to the operation previously discussed in connection with the re-run following a stop signal received in these same respective portions of a block. For that reason no further discussion of a re-run of an interrupted block is discussed in this section, but reference should be made to the appropriate section previously used to describe re-run following stop signals received at any time during transmission at the sending station.

*Detection of run-out failures at the transmitting station*

As will be noticed from a reading of the description of the system in preceding sections, an important part of the system of this invention is the run-out mechanism which releases a block of information from storage when it has been determined that the information contained in that block has been successfully transferred to the receiving station.

As has been described previously, should an error occur during transmission, the tape in storage at the sending station is pulled back and re-run through the tape reader. A failure in the run-out would cause an improper amount of tape to be stored. A re-run, involving a pull back of the tape in storage, then would result in a duplication of the transmitted information at the receiver. This is an undesirable condition which cannot be tolerated in a data system.

As stated previously, run-out is accomplished at the sending station by closing a contact on the character counter which actuates a run-out solenoid 8–ROS allowing one-half revolution of a sprocket pad-out wheel 40 (FIG. 2) on both the 30th and 48th count of a message block. When the 30th and 48th contacts open, the run-out solenoid is released to allow the run-out wheel to complete its revolution. Thus, closure and opening of either the 30th or the 48th contact allows one complete revolution of the run-out wheel, each revolution of which is equal to one-half of a message block, so that the two revolutions caused by the operation of both contacts amount to a run-out of a full block of information.

There are two types of run-out failures capable of causing difficulties in the re-run cycle following the detection of an error. The first of these is that the run-out wheel does not operate at all. The second of these is that only partial operation of the run-out wheel occurs due to the fact that the run-out solenoid 8–ROS pulls up, but does not release causing only ¼ of a block instead of ½ of a block of characters to be released from storage.

In order to detect possible run-out failures, switch M (see FIG. 2) is opened by a cam 48 shortly after the run-out wheel 40 starts rotating. The cam 48 causes the switch M to be opened, and the switch is returned to its normally closed condition only after the run-out wheel completes the second half of its rotation; that is, completes a full revolution.

The run-out detection logic will first be described for normal operation. As stated previously, the run-out solenoid 8–ROS is operated by either the 30th position switch 8–C–30 or the 48th position switch 8–C–48, and it is at these positions that the run-out operation should occur. At the same time the run-out solenoid is energized, a run-out detection relay 8–POS is operated completing a path extending from ground through the now closed run-out contact M, the now closed make contact 8–POS–3, and the winding of the relay 8–DUM to operate that relay. The rotation of the feed-out wheel 40 (FIG. 2) then causes the cam 48 to open contact M, but the relay 8–DUM holds operated through the now closed make contact 8–DUM–23 and 8–POS–1. Upon the release of the run-out solenoid 8–ROS at the end of the 30th and 48th characters, the relay 8–POS also is released, and the relay 8–DUM is released allowing completion of the run-out cycle. The conditions of the circuit following completion of the run-out are identical to those at the start of the sequence and normal operation continues.

Now, if for some reason, in the sequence described in the previous paragraph the run-out wheel does not operate, the contact M will not be opened and the relay 8–DUM will continue to be energized over a path extending from ground through the contact M, the now closed make contact 8–DUM–23, the winding of the relay 8–DUM to a source of positive potential. As a consequence, the relay 8–DUM is not released by the releasing of the relay 8–POS; and a path is completed extending from ground through the now closed contact M, the now closed make contact 8–DUM–23, the now closed break contact 8–POS–4, the now closed make contact 8–5–CNT–9 and the winding of disconnect relay 8–DSC to a source of positive potential to operate the relay 8–DSC. This in turn closes the make contact 5–8–DSC–1 causing a disconnect of the digital subset at the sending station and consequently a disconnect of the digital subset at the receiving station. At the same time a suitable alarm may be energized by the operation of the relay 8–DSC. It is necessary for operator intervention to correct the malfunctioning of the run-out wheel prior to re-initiation of transmission.

Figure 8:
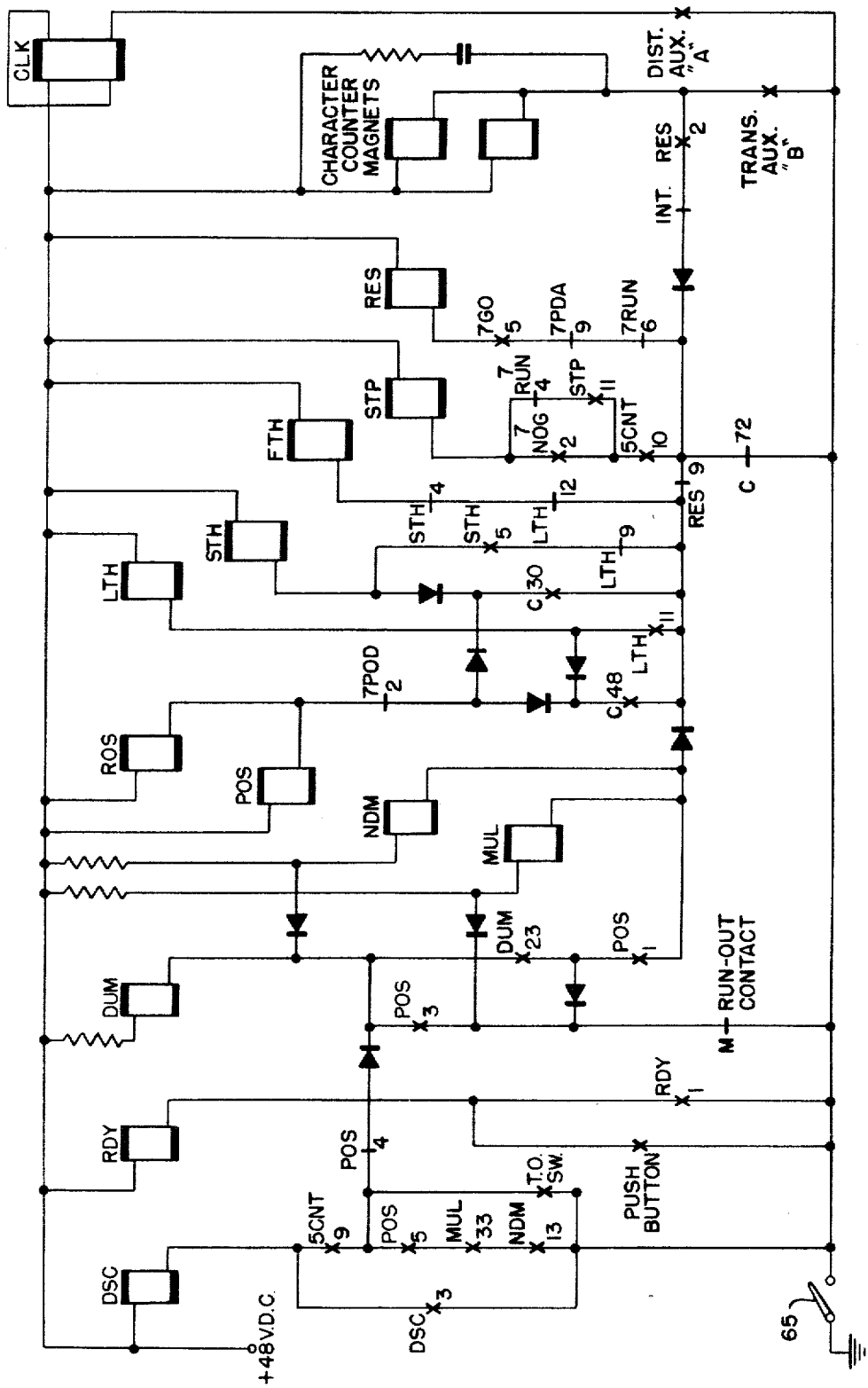

Now assume that the run-out sequence previously described is initiated, but for some reason the run-out solenoid sticks and/or run-out wheel 40 of FIG. 2 is jammed so that only a part of a revolution of the run-out wheel occurs. The relay 8–DUM is energized as before and the partial rotation of the run-out wheel 40 opens the switch M (FIG. 8). When the switch M is open, the shunt around the relay 8–MUL is removed causing that relay to operate and close the make contact 8–MUL–33. At this time the relay 8–NDM is shunted due to the fact that the make contacts 8–DUM–23 and 8–POS–1 are closed. Thus, the make contact 8–NDM–13 is open at this time. Now as the 30th or 48th position switch opens, the relay 8–POS is released as before causing the release of the relay 8–DUM. At this time the relay 8–NDM operates since the shunt across it is removed and the make contact 8–NDM–13 is closed. The circuit remains in this position until the next operation of either the 30th or 48th contact 8–C–30 or 8–C–48 which causes the relay 8–POS to once again be operated. Since the run-out was incomplete, the switch M is open throughout this entire period causing the relay 8–MUL to be operated thereby maintaining closed the make contact 8–MUL–33. Now, when the relay 8–POS is subsequently operated, a patch is completed extending from ground through the now closed make contacts 8–NDM–13, 8–MUL–33, 8–POS–5 and 8–5–CNT–9 and the coil of the disconnect relay 8–DSC to a source of positive potential causing the relay 8–DSC to operate indicating a run-out failure causing an alarm condition to occur.

It should be noted that the disconnect relay 8–DSC locks operated through its own make contact 8–DSC–3 and remains in this condition until the power switch 65 is opened and reclosed, so that resumption of transmission cannot begin until the operator intervenes.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention. For example, it will be obvious to those skilled in the art that a magnetic tape system may be substituted for the paper tape system disclosed by making minor changes in the sending and receiving equipment without altering the invention in any way. Also, electronic circuits could be substituted for the relay circuits disclosed if so desired.

What is claimed is:

1. In a communication system wherein information is transmitted in the form of a plurality of characters, a predetermined number of which constitute a message block;
- a sending station for transmitting blocks of information and including means for storing at least one block of information following its transmission by the sending station;
- means operated in response to the transmission of a predetermined number of characters for causing the removal of a predetermined amount of information from the storing means at the sending station;
- a receiving station including means for recording information transmitted by the sending station;
- means for interconnecting the sending station with the receiving station over a transmission line;
- means for interrupting transmission at the sending station in response to line disconnects;
- means for interrupting the operation of the recording means at the receiving station in response to line disconnects;
- means responsive to re-establishment of line connections following line disconnects for causing the sending station to retransmit the portion of the interrupted block stored in the storing means followed by transmission of the remainder of the interrupted block; and
- means responsive to re-establishment of line connections following line disconnect for deleting the interrupted block at the receiver while the recording means records the retransmitted block.

2. In a communication system wherein information is transmitted in the form of a plurality of characters, a predetermined number of which constitute a message block;
- a sending station for transmitting blocks of information and including means for storing at least one block of information following its transmission by the sending station;
- means responsive to the transmission of a predetermined number of characters in each block of information for causing the removal of the previously transmitted block of information from the storing means at the sending station;
- a receiving station including means for recording information transmitted by the sending station;
- means for interconnecting the sending station with the receiving station over a transmission line;
- means at the receiving station for generating a control signal;
- means at the receiving station responsive to the establishment of an interconnection between the sending station and the receiving station for automatically supplying the control signal to the sending station;
- means at the sending station responsive to the control signal for initiating transmission of information;
- means for interrupting transmission at the sending station in response to line disconnects;
- means for interrupting the operation of the recording means at the receiving station in response to line disconnects;
- means responsive to re-establishment of line connections following line disconnects for causing the sending station to retransmit the portion of the interrupted block stored in the storing means followed by transmission of the remainder of the interrupted block; and
- means responsive to re-establishment of line connections following line disconnect for deleting the interrupted block at the receiver while the recording means records the retransmitted block.

3. In a communications system wherein information is transmitted in the form of a plurality of data bits permutatively combined to form characters, a predetermined number of which constitute a message block;
- a sending station for transmitting blocks of information and including means for storing at least one block of information following its transmission by the sending station;
- means responsive to transmission of a predetermined number of characters in each block of information for causing the removal of the previously transmitted block of information from the storing means;
- a receiving station including means for recording information transmitted by the sending station;
- means for interconnecting the sending station and the receiving station over a transmission line;
- means at the receiving station for generating and supplying control signals to the sending station;
- means at the sending station responsive to line disconnects for interrupting transmission from the sending station;
- means at the receiving station responsive to line disconnects for blinding the recording means and causing it to fill out the interrupted block with fill characters;
- means for causing the receiving station to supply the control signals to the sending station upon re-establishment of line connections following line disconnects;
- means at the sending station responsive to the receipt of control signals following line disconnects for causing retransmission of the portion of the interrupted block stored in the storing means followed by the transmission of the remainder of the interrupted block; and
- means for deleting the filled interrupted block simultaneously while the recording means records the retransmitted block following reconnection and resumption of operation of the system.

4. In a communication system having error detection and correction facilities wherein information is transmitted by means of a plurality of data bits of different conditions permutatively combined to form characters, a predetermined number of which constitute a message block;
- a sending station for transmitting blocks of information and including means for storing at least one block of information following its transmission by the sending station;
- counting means for providing a continuous count of the number of characters transmitted in each block;
- first control means responsive to at least one predetermined count from the counting means for causing the sending station to release a predetermined amount of information from the storing means during transmission of the next succeeding block;
- a receiving station including means for recording information transmitted by the sending station;
- means for interconnecting the sending station and the receiving station over a transmission line;
- means at the receiving station for generating rerun signals;
- means for supplying the rerun signals to the sending station;
- means at the sending station and at the receiving station responsive to line disconnects interrupting the transmission of information from the sending station and the recording of information at the receiving station;
- second control means operated in response to receipt of a rerun signal upon re-establishment of line connections following a line disconnect for causing the first control means to release a predetermined amount of information from storage only if the character count was below the predetermined count at the time the line disconnect occurred, and means for causing retransmission of all the information remaining in storage following the operation of the second control means.

5. A system according to claim 4 wherein means is provided at the receiving station responsive to the occurrence of a line disconnect followed by the operation of the signal generating means for deleting a predetermined number of characters while the recording means is recording the retransmitted information.

6. In a communication system having error detection and correction facilities wherein information is transmitted by means of a plurality of data bits of different conditions permutatively combined to form characters, a predetermined number of which constitute a message block;

a sending station for transmitting blocks of information and including means for storing at least one block of information following its transmission by the sending station;

counting means for providing a continuous count of the number of characters transmitted in each block;

first control means responsive to at least one predetermined count from the counting means for causing the sending station to release a predetermined amount of information from the storing means during transmission of the next succeeding block;

a receiving station including means for recording information transmitted by the sending station;

means for interconnecting the sending station and the receiving station over a transmission line;

means at the receiving station responsive to the establishment of an interconnection between the sending station and the receiving station for generating rerun signals;

means for supplying the rerun signals to the sending station;

means at the sending station and at the receiving station responsive to line disconnects for interrupting the transmission of information from the sending station and the recording of information at the receiving station;

second control means at the sending station operated in response to a rerun signal generated by the generating means upon re-establishment of line connections following a line disconnect for causing the first control means to release a predetermined amount of information from storage only if the character count is below the predetermined count at the time the rerun signal or line disconnect occurs; and means for causing retransmission of all the information remaining in storage following the operation of the second control means.

References Cited

UNITED STATES PATENTS

| | | | |
|---|---|---|---|
| 2,518,405 | 8/1950 | Van Duuren | 178—2 |
| 2,967,908 | 1/1961 | Gray et al. | 178—69 |
| 2,988,596 | 6/1961 | Van Dalen | 178—23 |
| 3,131,377 | 4/1964 | Grondin | 340—172.5 |
| 3,162,811 | 12/1964 | Clune | 325—121 |
| 3,228,000 | 1/1966 | Collis | 340—146.1 |
| 3,242,461 | 3/1966 | Silberg et al. | 340—146.1 |
| 3,263,215 | 7/1966 | Brooke | 340—146.1 |

MALCOLM A. MORRISON, *Primary Examiner.*

K. MILDE, *Assistant Examiner.*

UNITED STATES PATENT OFFICE
CERTIFICATE OF CORRECTION

Patent No. 3,340,504                                        September 5, 1967

Joseph A. Bellino

It is hereby certified that error appears in the above numbered patent requiring correction and that the said Letters Patent should read as corrected below.

Column 2, line 38, for "sttaion" read -- station --; column 6, line 73, for "of" read -- to --; column 26, line 53, for "patch" read -- path --; column 28, line 65, after "disconnects" insert -- for --.

Signed and sealed this 7th day of January 1969.

(SEAL)
Attest:

Edward M. Fletcher, Jr.                               EDWARD J. BRENNER

Attesting Officer                                             Commissioner of Patents